United States Patent [19]

Sato

[11] Patent Number: 5,638,496
[45] Date of Patent: Jun. 10, 1997

[54] COLOR IMAGE INPUT APPARATUS HAVING COLOR IMAGE IDENTIFYING FUNCTION

[75] Inventor: Toshio Sato, Yokohama, Japan

[73] Assignee: Kabushiki Kaisha Toshiba, Kanagawa-ken, Japan

[21] Appl. No.: 350,322

[22] Filed: Dec. 5, 1994

[30] Foreign Application Priority Data

Dec. 8, 1993 [JP] Japan ................................. 5-307876

[51] Int. Cl.$^6$ ........................................ G06K 1/00
[52] U.S. Cl. ........................ 395/109; 355/201; 382/135
[58] Field of Search ................................. 395/100, 101, 395/109, 117, 118, 133; 382/135, 137, 165, 112, 116, 140; 355/201; 358/530, 408, 448, 449, 462, 133

[56] References Cited

U.S. PATENT DOCUMENTS

| | | | |
|---|---|---|---|
| 4,797,937 | 1/1989 | Tajima | 382/165 |
| 5,227,871 | 7/1993 | Funada et al. | 358/75 |
| 5,321,470 | 6/1994 | Hasuo et al. | 382/135 |
| 5,363,454 | 11/1994 | Udagawa et al. | 382/135 |
| 5,367,577 | 11/1994 | Gotaas | 382/135 |
| 5,379,093 | 1/1995 | Hashimoto et al. | 355/201 |
| 5,390,003 | 2/1995 | Yamaguchi et al. | 382/135 |
| 5,398,124 | 3/1995 | Hirota | 358/530 |
| 5,426,710 | 6/1995 | Suzuki et al. | 382/135 |
| 5,434,649 | 7/1995 | Hasuo et al. | 355/201 |
| 5,475,468 | 12/1995 | Natsudaira | 355/201 |
| 5,502,575 | 3/1996 | Kai et al. | 358/408 |
| 5,515,451 | 5/1996 | Tsuji et al. | 382/135 |

FOREIGN PATENT DOCUMENTS 4-54681  2/1992  Japan .............. G06F 15/70

*Primary Examiner*—Leo Boudreau
*Assistant Examiner*—Gabriel I. Garcia
*Attorney, Agent, or Firm*—Limbach & Limbach LLP

[57] ABSTRACT

A line sensor and image input section input a color image in a reading area containing an original, an original extracting section extracts an area of the original from the input image, a normalization section normalizes an image of the extracted original area to an image of preset size, an image averaging section converts the normalized image into an averaged image, and a brightness-hue-chroma converting section converts the averaged image in Vcd images used as color perception amounts of a human being. A pattern matching section collates the Vcd image with dictionary data in a dictionary data storing section to determine whether or not the original is a specified type of original such as a bill, and an image output controlling section determines whether or not image data output from the color image input section is to be output to the exterior based on the result of identification.

8 Claims, 24 Drawing Sheets

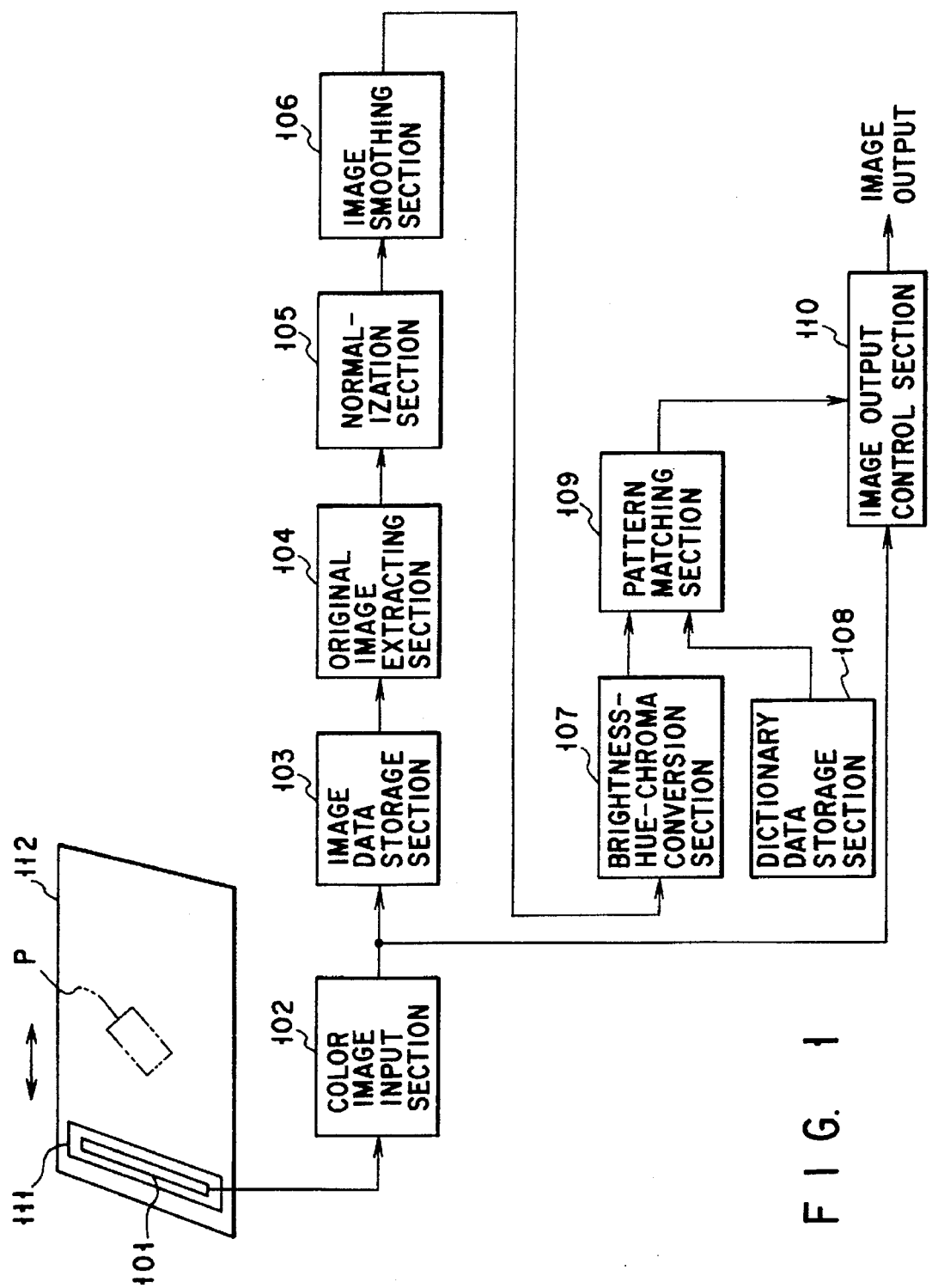
F I G. 1

| 126 | 80  | 124 | 120 | 89  | 124 | 124 | 125 | 125 | 95  |
|-----|-----|-----|-----|-----|-----|-----|-----|-----|-----|
| 124 | 124 | 124 | 124 | 124 | 125 | 126 | 124 | 124 | 125 |
| 126 | 70  | 65  | 45  | 40  | 60  | 35  | 32  | 135 | 140 |
| 125 | 65  | 40  | 40  | 35  | 38  | 41  | 30  | 48  | 138 |
| 130 | 68  | 40  | 28  | 32  | 35  | 40  | 54  | 52  | 135 |
| 129 | 80  | 55  | 60  | 30  | 31  | 35  | 50  | 55  | 125 |
| 127 | 90  | 115 | 120 | 121 | 120 | 125 | 120 | 119 | 120 |
| 126 | 124 | 125 | 123 | 121 | 122 | 123 | 122 | 119 | 125 |
| 125 | 115 | 121 | 122 | 124 | 125 | 120 | 120 | 120 | 124 |
| 124 | 85  | 124 | 120 | 125 | 126 | 81  | 95  | 100 | 125 |
| 125 | 70  | 54  | 55  | 64  | 64  | 53  | 83  | 83  | 123 |
| 130 | 68  | 48  | 54  | 83  | 65  | 58  | 54  | 90  | 121 |
| 129 | 65  | 49  | 48  | 80  | 63  | 65  | 56  | 85  | 122 |
| 128 | 53  | 70  | 80  | 80  | 110 | 115 | 110 | 82  | 123 |
| 127 | 128 | 130 | 131 | 132 | 130 | 131 | 132 | 131 | 120 |

FIG. 5

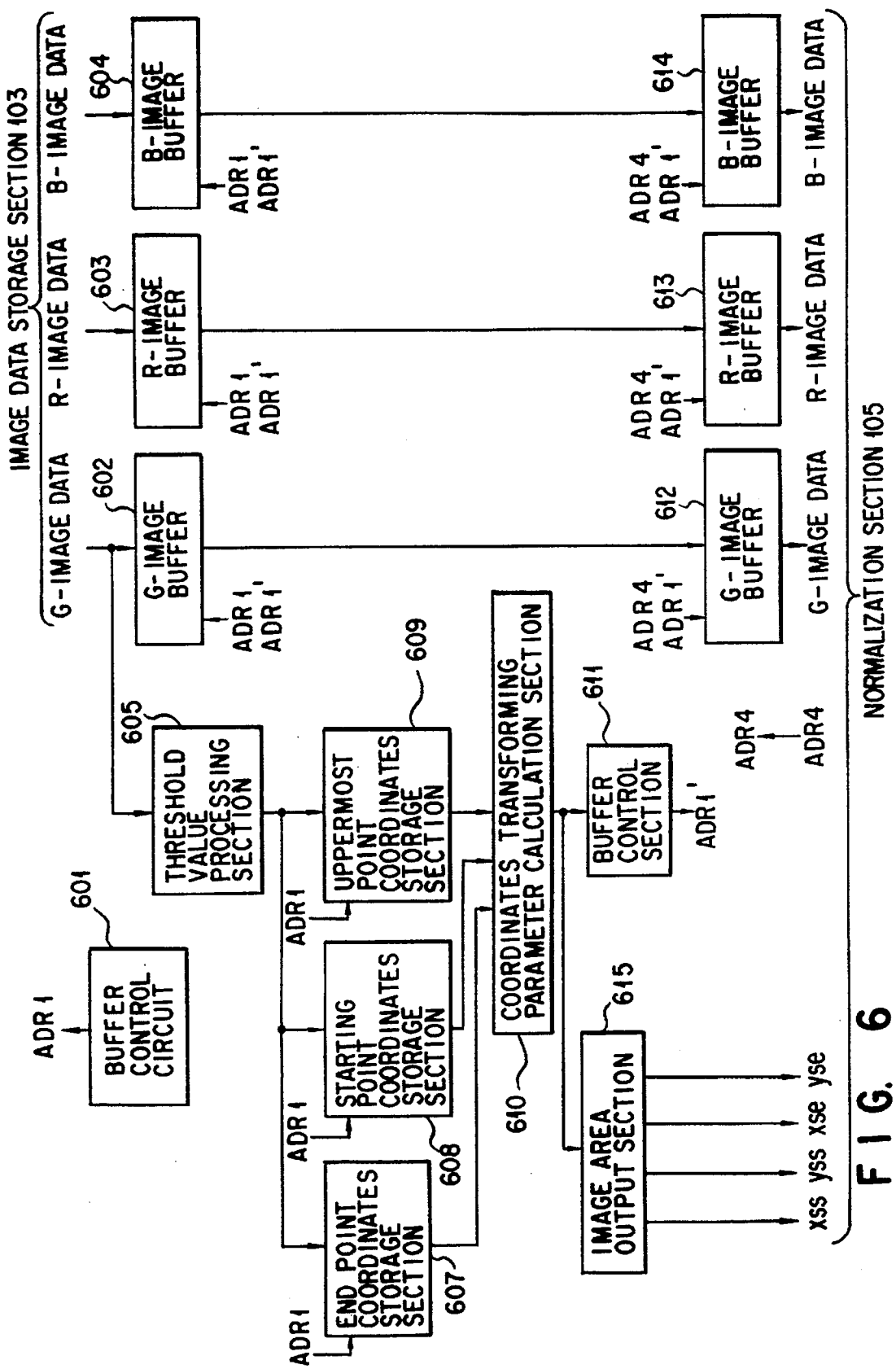
F I G. 6

| 126 | 80 | 80 | 124 | 124 | 120 | 120 | 89 | 89 | 124 | 124 | 124 | 124 | 125 | 125 | 125 | 125 | 95 | 95 |
|---|---|---|---|---|---|---|---|---|---|---|---|---|---|---|---|---|---|---|
| 124 | 124 | 124 | 124 | 124 | 124 | 124 | 124 | 124 | 125 | 125 | 126 | 126 | 124 | 124 | 124 | 124 | 125 | 125 |
| 126 | 70 | 70 | 65 | 65 | 45 | 45 | 40 | 40 | 60 | 60 | 35 | 35 | 32 | 32 | 135 | 135 | 140 | 140 |
| 126 | 70 | 70 | 65 | 65 | 45 | 45 | 40 | 40 | 60 | 60 | 35 | 35 | 32 | 32 | 135 | 135 | 140 | 140 |
| 125 | 65 | 65 | 40 | 40 | 40 | 40 | 35 | 35 | 38 | 38 | 41 | 41 | 30 | 30 | 48 | 48 | 138 | 138 |
| 125 | 65 | 65 | 40 | 40 | 40 | 40 | 35 | 35 | 38 | 38 | 41 | 41 | 30 | 30 | 48 | 48 | 138 | 138 |
| 130 | 68 | 68 | 40 | 40 | 28 | 28 | 32 | 32 | 35 | 35 | 40 | 40 | 54 | 54 | 52 | 52 | 135 | 135 |
| 130 | 68 | 68 | 40 | 40 | 28 | 28 | 32 | 32 | 35 | 35 | 40 | 40 | 54 | 54 | 52 | 52 | 135 | 135 |
| 129 | 80 | 80 | 55 | 55 | 70 | 70 | 30 | 30 | 31 | 31 | 35 | 35 | 56 | 56 | 55 | 55 | 125 | 125 |
| 129 | 80 | 80 | 55 | 55 | 70 | 70 | 30 | 30 | 31 | 31 | 35 | 35 | 56 | 56 | 55 | 55 | 125 | 125 |
| 127 | 90 | 90 | 115 | 115 | 120 | 120 | 121 | 121 | 120 | 120 | 125 | 125 | 120 | 120 | 115 | 115 | 120 | 120 |
| 127 | 90 | 90 | 115 | 115 | 120 | 120 | 121 | 121 | 120 | 120 | 125 | 125 | 120 | 120 | 115 | 115 | 120 | 120 |
| 126 | 124 | 124 | 125 | 125 | 123 | 123 | 121 | 121 | 122 | 122 | 123 | 123 | 122 | 122 | 119 | 119 | 125 | 125 |
| 126 | 124 | 124 | 125 | 125 | 123 | 123 | 121 | 121 | 122 | 122 | 123 | 123 | 122 | 122 | 119 | 119 | 125 | 125 |
| 125 | 115 | 115 | 121 | 121 | 122 | 122 | 124 | 124 | 125 | 125 | 120 | 120 | 120 | 120 | 120 | 120 | 124 | 124 |
| 125 | 115 | 115 | 121 | 121 | 122 | 122 | 124 | 124 | 125 | 125 | 120 | 120 | 120 | 120 | 120 | 120 | 124 | 124 |
| 124 | 85 | 85 | 124 | 124 | 120 | 120 | 125 | 125 | 126 | 126 | 81 | 81 | 95 | 95 | 100 | 100 | 125 | 125 |
| 124 | 85 | 85 | 124 | 124 | 120 | 120 | 125 | 125 | 126 | 126 | 81 | 81 | 95 | 95 | 100 | 100 | 125 | 125 |
| 125 | 70 | 70 | 54 | 54 | 55 | 55 | 64 | 64 | 64 | 64 | 53 | 53 | 83 | 83 | 83 | 83 | 123 | 123 |
| 125 | 70 | 70 | 54 | 54 | 55 | 55 | 64 | 64 | 64 | 64 | 53 | 53 | 83 | 83 | 83 | 83 | 123 | 123 |
| 130 | 68 | 68 | 48 | 48 | 54 | 54 | 83 | 83 | 65 | 65 | 58 | 58 | 54 | 54 | 90 | 90 | 121 | 121 |
| 130 | 68 | 68 | 48 | 48 | 54 | 54 | 83 | 83 | 65 | 65 | 58 | 58 | 54 | 54 | 90 | 90 | 121 | 121 |
| 129 | 65 | 65 | 49 | 49 | 48 | 48 | 80 | 80 | 63 | 63 | 65 | 65 | 56 | 56 | 85 | 85 | 122 | 122 |
| 129 | 65 | 65 | 49 | 49 | 48 | 48 | 80 | 80 | 63 | 63 | 65 | 65 | 56 | 56 | 85 | 85 | 122 | 122 |
| 128 | 53 | 53 | 70 | 70 | 80 | 80 | 80 | 80 | 110 | 110 | 115 | 115 | 110 | 110 | 82 | 82 | 123 | 123 |
| 128 | 53 | 53 | 70 | 70 | 80 | 80 | 80 | 80 | 110 | 110 | 115 | 115 | 110 | 110 | 82 | 82 | 123 | 123 |
| 127 | 128 | 128 | 130 | 130 | 131 | 131 | 132 | 132 | 130 | 130 | 131 | 131 | 132 | 132 | 131 | 131 | 120 | 120 |
| 127 | 128 | 128 | 130 | 130 | 131 | 131 | 132 | 132 | 130 | 130 | 131 | 131 | 132 | 132 | 131 | 131 | 120 | 120 |

FIG. 12

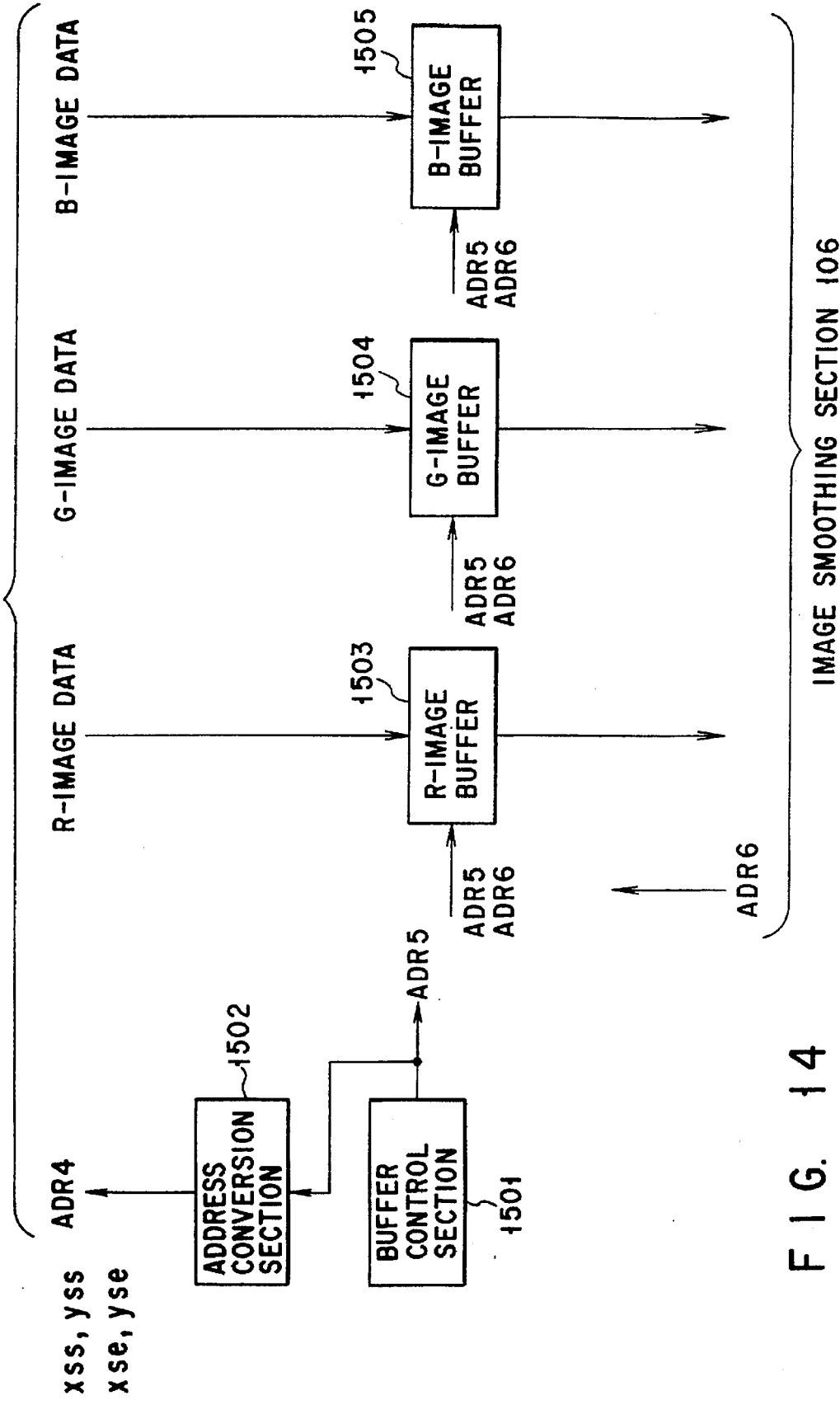
F I G. 14

| 1/2 | 1/2 | 1 | 1/2 | 1/2 |
|---|---|---|---|---|
| 1/2 | 1/2 | 1 | 1/2 | 1/2 |
| 1 | 1 | 2 | 1 | 1 |
| 1/2 | 1/2 | 1 | 1/2 | 1/2 |
| 1/2 | 1/2 | 1 | 1/2 | 1/2 |

FIG. 17

7 PIXELS / 10 PIXELS

| 47 | 66 | 65 | 66 | 62 | 78 | 52 |
|---|---|---|---|---|---|---|
| 68 | 70 | 57 | 58 | 56 | 90 | 86 |
| 81 | 51 | 37 | 35 | 41 | 63 | 76 |
| 70 | 77 | 69 | 62 | 69 | 84 | 82 |
| 84 | 118 | 122 | 122 | 122 | 120 | 81 |
| 77 | 117 | 122 | 122 | 112 | 115 | 81 |
| 67 | 76 | 80 | 82 | 73 | 93 | 77 |
| 65 | 56 | 61 | 71 | 60 | 84 | 75 |
| 66 | 73 | 81 | 95 | 99 | 98 | 76 |
| 53 | 76 | 79 | 82 | 84 | 81 | 53 |

FIG. 18

R PIXEL (rows 0 to 46H):

| 47 | 66 | 65 | 66 | 62 | 78 | 52 |
|---|---|---|---|---|---|---|
| 68 | 70 | 57 | 58 | 56 | 90 | 86 |
| 81 | 51 | 37 | 35 | 41 | 63 | 76 |
| 70 | 77 | 69 | 62 | 69 | 84 | 82 |
| 84 | 118 | 122 | 122 | 122 | 120 | 81 |
| 77 | 117 | 122 | 122 | 112 | 115 | 81 |
| 67 | 76 | 80 | 82 | 73 | 93 | 77 |
| 65 | 56 | 61 | 71 | 60 | 84 | 75 |
| 66 | 73 | 81 | 95 | 99 | 98 | 76 |
| 53 | 76 | 79 | 82 | 84 | 81 | 53 |

G PIXEL (rows to 8CH):

| 51 | 68 | 67 | 68 | 65 | 80 | 53 |
|---|---|---|---|---|---|---|
| 70 | 72 | 50 | 53 | 53 | 85 | 82 |
| 82 | 52 | 37 | 35 | 41 | 63 | 74 |
| 72 | 75 | 67 | 60 | 67 | 81 | 80 |
| 86 | 118 | 122 | 123 | 122 | 120 | 81 |
| 79 | 115 | 122 | 121 | 112 | 110 | 80 |
| 69 | 75 | 82 | 82 | 75 | 90 | 75 |
| 69 | 58 | 61 | 75 | 65 | 90 | 76 |
| 68 | 75 | 77 | 97 | 89 | 89 | 76 |
| 55 | 78 | 81 | 80 | 84 | 81 | 53 |

B PIXEL:

| 42 | 45 | 47 | 45 | 44 | 48 | 40 |
|---|---|---|---|---|---|---|
| 51 | 52 | 51 | 53 | 44 | 47 | 47 |
| 48 | 35 | 30 | 32 | 31 | 34 | 46 |
| 50 | 36 | 31 | 35 | 41 | 42 | 48 |
| 50 | 60 | 61 | 62 | 75 | 80 | 51 |
| 40 | 50 | 61 | 80 | 45 | 44 | 44 |
| 45 | 45 | 32 | 58 | 45 | 45 | 42 |
| 45 | 46 | 33 | 45 | 43 | 38 | 43 |
| 43 | 60 | 35 | 43 | 43 | 25 | 41 |
| 41 | 42 | 43 | 45 | 44 | 40 | 40 |

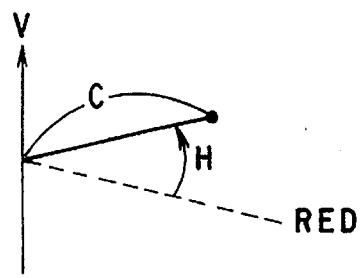
F I G. 20
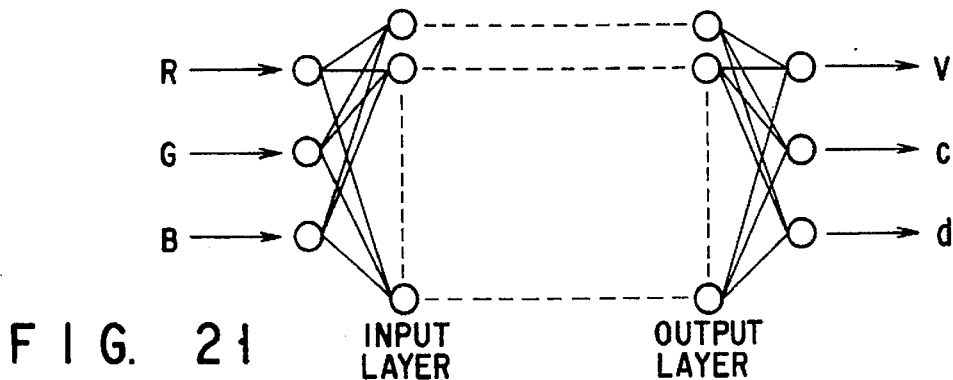
F I G. 21
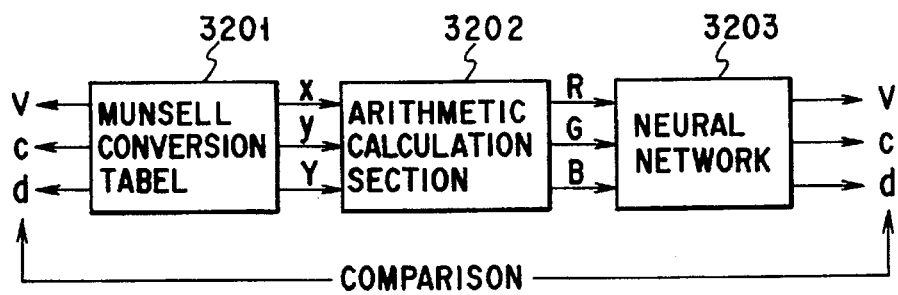
F I G. 22
| V | C | H | Y | x | y |
|---|---|---|---|---|---|
| 9 | 6 | 2.5 R $=\frac{39}{40} \times 2\pi$ | 78.66 | 0.3665 | 0.3183 |
| 9 | 4 | 2.5 R | 78.66 | 0.3445 | 0.3179 |
| 9 | 2 | 2.5 R | 78.66 | 0.3220 | 0.3168 |
| 9 | 1 | 2.5 R | 78.66 | — | — |
| 8 | 10 | 2.5 R | 59.10 | 0.4125 | 0.3160 |
| 8 | 8 | 2.5 R | 59.10 | 0.3900 | 0.3171 |
| 8 | 6 | 2.5 R | 59.10 | 0.3071 | 0.3175 |
| ⋮ | ⋮ | ⋮ | ⋮ | ⋮ | ⋮ |
F I G. 23

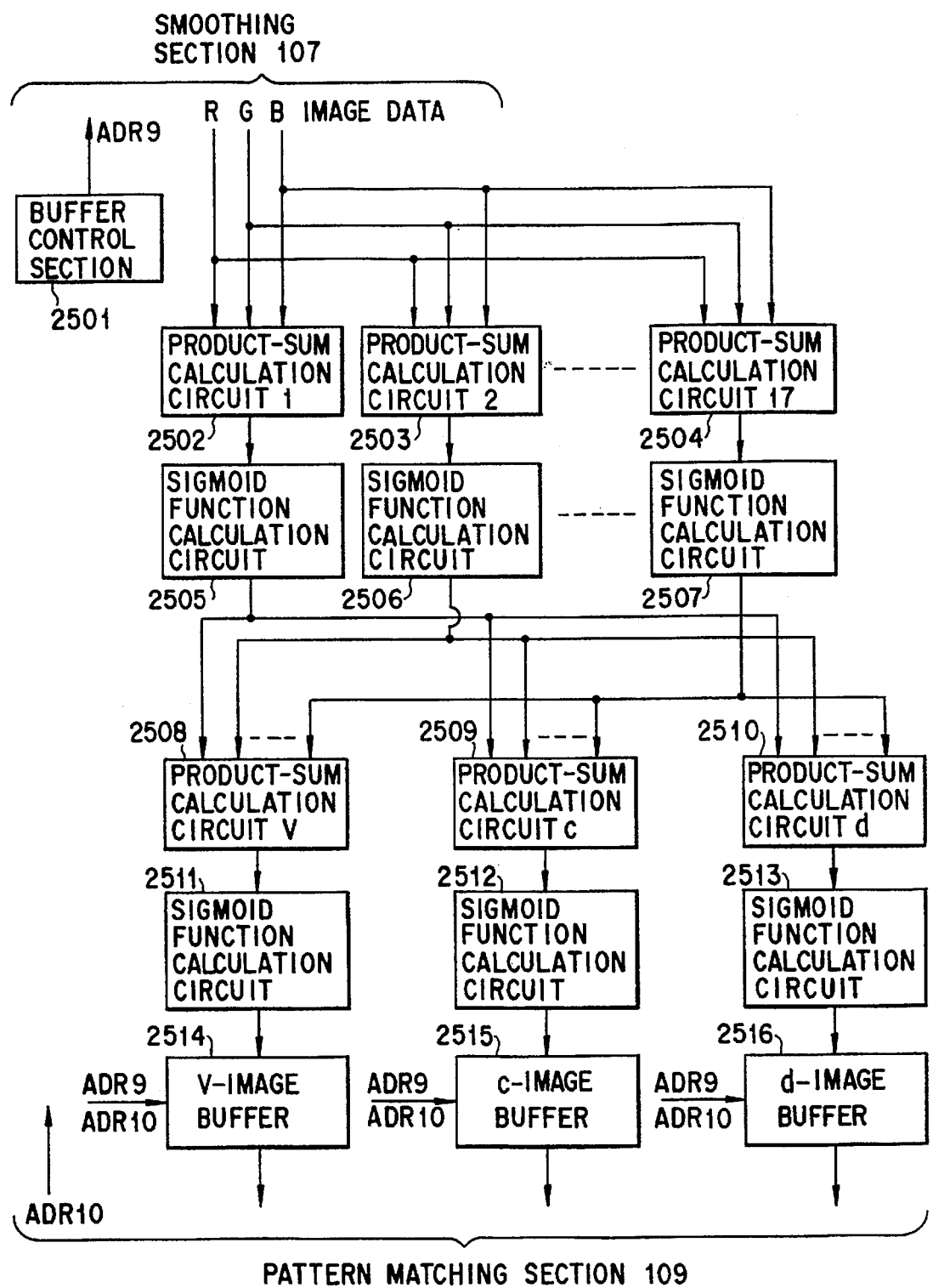
F I G. 24

| | | | | | | |
|---|---|---|---|---|---|---|
| 6 | 13 | 13 | 13 | 13 | 13 | 6 |
| 9 | 17 | 21 | 26 | 31 | 30 | 17 |
| 9 | 17 | 32 | 45 | 52 | 57 | 28 |
| 10 | 24 | 35 | 42 | 66 | 81 | 28 |
| 12 | 30 | 41 | 52 | 88 | 119 | 35 |
| 14 | 32 | 45 | 55 | 91 | 125 | 30 |
| 11 | 25 | 51 | 55 | 118 | 121 | 31 |
| 11 | 27 | 44 | 45 | 59 | 63 | 23 |
| 9 | 15 | 15 | 15 | 15 | 17 | 12 |
| 6 | 13 | 13 | 13 | 13 | 13 | 6 |

} V IMAGE

| | | | | | | |
|---|---|---|---|---|---|---|
| 128 | 128 | 128 | 128 | 128 | 128 | 128 |
| 128 | 131 | 131 | 131 | 128 | 115 | 129 |
| 128 | 131 | 132 | 131 | 118 | 116 | 129 |
| 128 | 131 | 132 | 132 | 117 | 117 | 129 |
| 128 | 131 | 132 | 132 | 116 | 116 | 129 |
| 128 | 129 | 130 | 127 | 115 | 115 | 129 |
| 128 | 127 | 129 | 126 | 119 | 119 | 128 |
| 128 | 126 | 126 | 126 | 121 | 121 | 128 |
| 128 | 127 | 126 | 125 | 125 | 125 | 128 |
| 128 | 128 | 128 | 128 | 128 | 128 | 128 |

} c IMAGE

| | | | | | | |
|---|---|---|---|---|---|---|
| 128 | 128 | 128 | 128 | 128 | 128 | 128 |
| 128 | 128 | 129 | 129 | 129 | 135 | 126 |
| 128 | 128 | 129 | 129 | 130 | 136 | 126 |
| 128 | 129 | 129 | 135 | 136 | 137 | 126 |
| 128 | 120 | 115 | 135 | 136 | 138 | 126 |
| 128 | 120 | 109 | 107 | 131 | 137 | 128 |
| 128 | 111 | 109 | 107 | 145 | 138 | 128 |
| 128 | 111 | 110 | 128 | 137 | 135 | 128 |
| 128 | 111 | 110 | 129 | 131 | 131 | 128 |
| 128 | 128 | 128 | 128 | 128 | 128 | 128 |

} d IMAGE

FIG. 25

| | | | | | | | |
|---|---|---|---|---|---|---|---|
| 7 | 15 | 15 | 15 | 15 | 15 | 7 | ⎫ |
| 10 | 18 | 23 | 27 | 33 | 32 | 18 | |
| 10 | 18 | 35 | 47 | 53 | 59 | 29 | |
| 11 | 26 | 38 | 45 | 70 | 83 | 29 | |
| 13 | 31 | 43 | 55 | 91 | 121 | 36 | |
| 15 | 33 | 48 | 57 | 96 | 127 | 37 | ⎬ V IMAGE |
| 12 | 28 | 53 | 57 | 121 | 124 | 32 | |
| 12 | 29 | 46 | 48 | 61 | 65 | 32 | |
| 10 | 17 | 17 | 17 | 17 | 19 | 24 | |
| 7 | 15 | 15 | 15 | 15 | 15 | 7 | ⎭ |
| 128 | 128 | 128 | 128 | 128 | 128 | 128 | ⎫ |
| 128 | 133 | 141 | 129 | 129 | 129 | 128 | |
| 128 | 133 | 141 | 138 | 131 | 130 | 128 | |
| 128 | 132 | 138 | 142 | 137 | 129 | 128 | |
| 128 | 128 | 135 | 138 | 143 | 104 | 128 | ⎬ c IMAGE |
| 128 | 125 | 128 | 135 | 129 | 105 | 128 | |
| 128 | 125 | 130 | 128 | 115 | 120 | 128 | |
| 128 | 126 | 136 | 137 | 120 | 115 | 128 | |
| 128 | 127 | 130 | 130 | 128 | 120 | 128 | |
| 128 | 128 | 128 | 128 | 128 | 128 | 128 | ⎭ |
| 128 | 128 | 128 | 128 | 128 | 128 | 128 | ⎫ |
| 128 | 130 | 130 | 135 | 129 | 130 | 128 | |
| 128 | 125 | 125 | 124 | 124 | 121 | 128 | |
| 128 | 120 | 118 | 109 | 131 | 121 | 128 | |
| 128 | 118 | 109 | 113 | 130 | 121 | 128 | ⎬ d IMAGE |
| 128 | 109 | 112 | 111 | 131 | 121 | 128 | |
| 128 | 113 | 112 | 115 | 130 | 121 | 128 | |
| 128 | 111 | 115 | 128 | 131 | 121 | 128 | |
| 128 | 130 | 131 | 130 | 130 | 121 | 128 | |
| 128 | 128 | 128 | 128 | 128 | 128 | 128 | ⎭ |

FIG. 26

| CATEGORY 1 V IMAGE |
|---|
| CATEGORY 1 c IMAGE |
| CATEGORY 1 d IMAGE |
| CATEGORY 2 V IMAGE |
| CATEGORY 2 c IMAGE |
| CATEGORY 2 d IMAGE |
| ⋮ |
| CATEGORY n-1 d IMAGE |
| CATEGORY n V IMAGE |
| CATEGORY n c IMAGE |
| CATEGORY n d IMAGE |

F I G. 27

| 1000-YEN BILL V IMAGE |
|---|
| 1000-YEN BILL c IMAGE |
| 1000-YEN BILL d IMAGE |
| 1000-YEN BILL V IMAGE (TURNED) |
| 1000-YEN BILL c IMAGE (TURNED) |
| 1000-YEN BILL d IMAGE (TURNED) |
| 5000-YEN BILL V IMAGE |
| 5000-YEN BILL c IMAGE |
| 5000-YEN BILL d IMAGE |
| 5000-YEN BILL V IMAGE (TURNED) |
| 5000-YEN BILL c IMAGE (TURNED) |
| 5000-YEN BILL d IMAGE (TURNED) |
| 10000-YEN BILL V IMAGE |
| 10000-YEN BILL c IMAGE |
| 10000-YEN BILL d IMAGE |
| 10000-YEN BILL V IMAGE (TURNED) |
| 10000-YEN BILL c IMAGE (TURNED) |
| 10000-YEN BILL d IMAGE (TURNED) |

F I G. 28

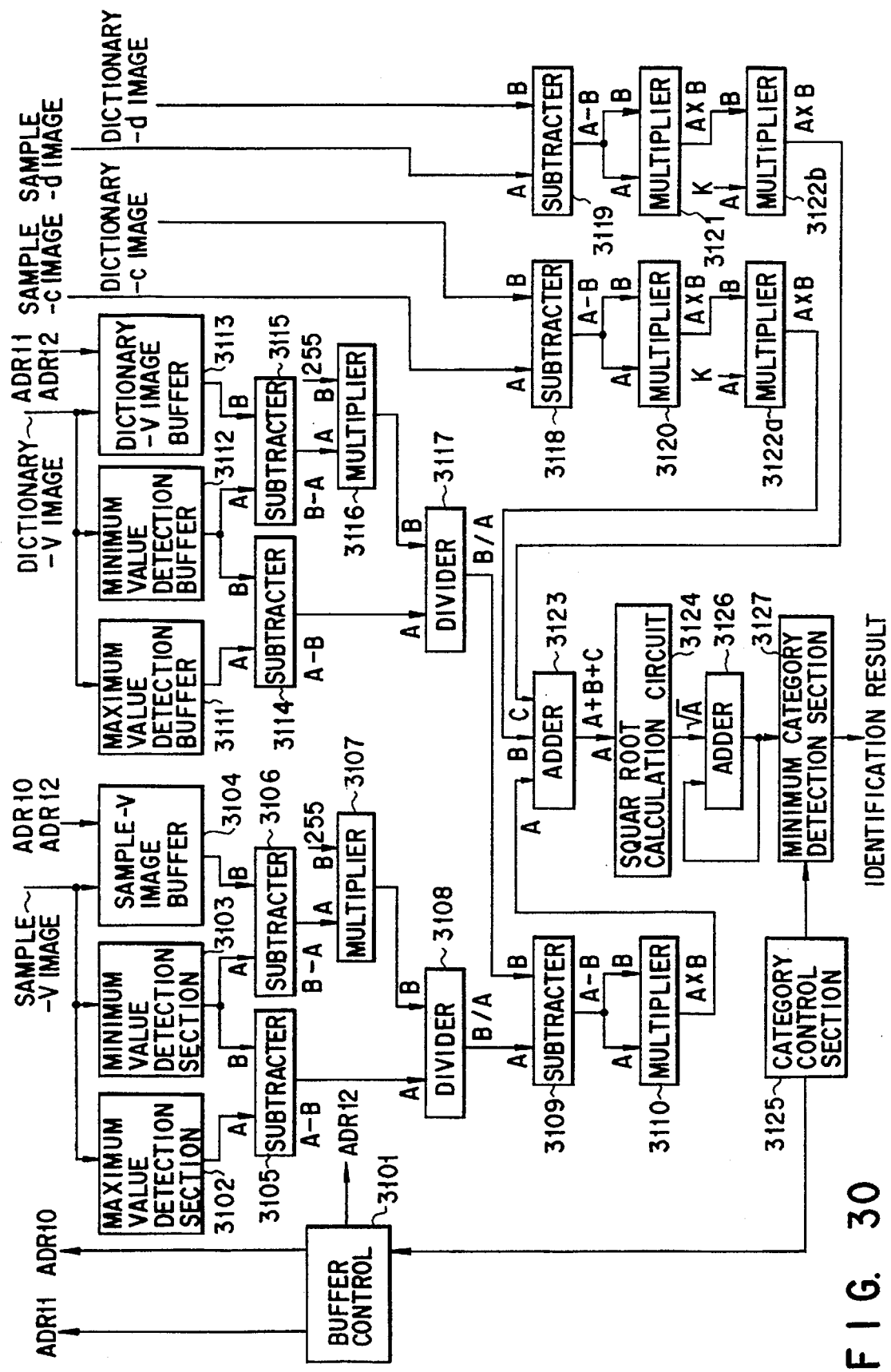
F I G. 30

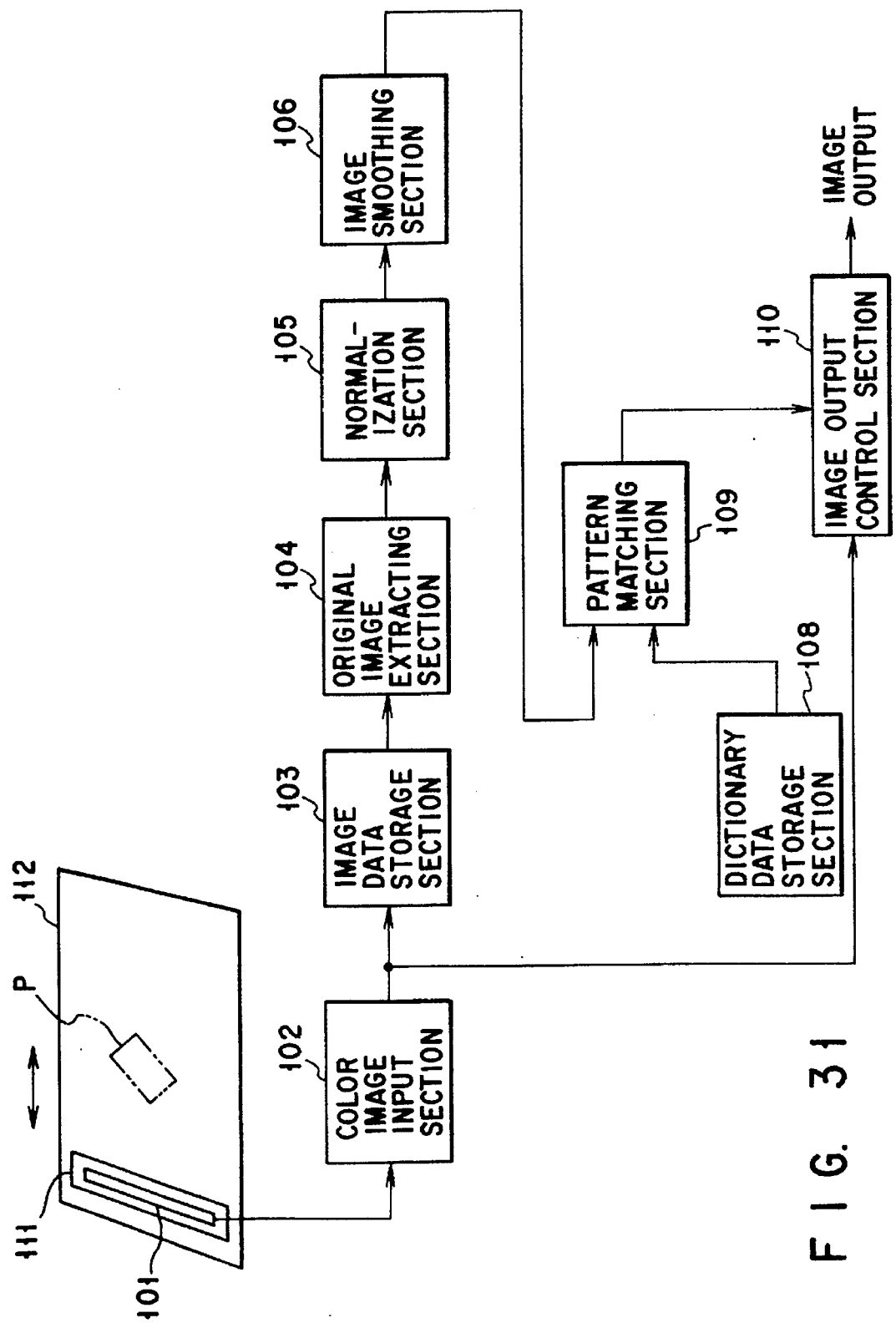
F I G. 31

| |
|---|
| 1000-YEN BILL R IMAGE |
| 1000-YEN BILL G IMAGE |
| 1000-YEN BILL B IMAGE |
| 1000-YEN BILL R IMAGE (TURNED) |
| 1000-YEN BILL G IMAGE (TURNED) |
| 1000-YEN BILL B IMAGE (TURNED) |
| 5000-YEN BILL R IMAGE |
| 5000-YEN BILL G IMAGE |
| 5000-YEN BILL B IMAGE |
| 5000-YEN BILL R IMAGE (TURNED) |
| 5000-YEN BILL G IMAGE (TURNED) |
| 5000-YEN BILL B IMAGE (TURNED) |
| 10000-YEN BILL R IMAGE |
| 10000-YEN BILL G IMAGE |
| 10000-YEN BILL B IMAGE |
| 10000-YEN BILL R IMAGE (TURNED) |
| 10000-YEN BILL G IMAGE (TURNED) |
| 10000-YEN BILL B IMAGE (TURNED) |
F I G. 32
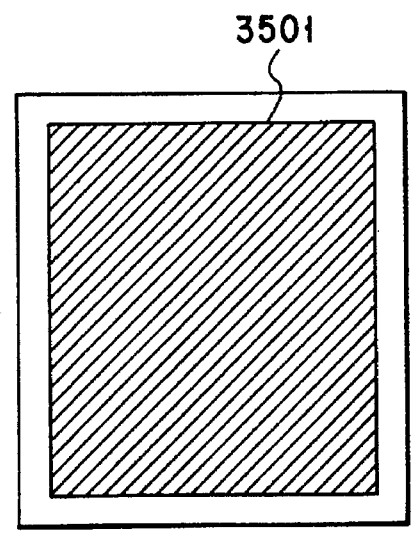
F I G. 34

COLOR IMAGE INPUT APPARATUS HAVING COLOR IMAGE IDENTIFYING FUNCTION

BACKGROUND OF THE INVENTION

1. Field of the Invention

This invention relates to an image input apparatus for inputting a color image on an original in a digital color copying machine, and more particularly to an image input apparatus having a function of automatically detecting the presence or absence of a specified original and controlling the output format or manner of the input image.

2. Description of the Related Art

Recently, as the digital color copying machine is more widely used and the image quality thereof is further enhanced, the possibility that crimes of forging bills, stocks or bonds are committed becomes higher.

Therefore, as a means for preventing the above crimes, a copying machine is developed which extracts a specified pattern based on an output of image input means such as a line sensor for inputting a color image on an original, detects the presence or absence of a bill or the like in the original by deriving the matching degree between the extracted specified pattern and a preset reference pattern and inhibits or interrupts the copying operation when the presence of the bill or the like is detected.

As a method for detecting a specified object from unspecified objects with high precision by use of a color image, for example, a method disclosed in U.S. patent application Ser. No. 275,441, filed on Jul. 15, 1994 is proposed. This method is to detect a bill or the like by forming a histogram or a frequency distribution pattern based on the color image and comparing the distribution pattern with a reference pattern.

However, in the conventional specified original identifying method, for example, the identifying method for comparing the frequency distribution of the color image with reference data, even a different pattern may sometimes have the same frequency distribution, and in this case, the identification operation will be erroneously effected. Further, storing means not only for the image pattern but also for frequency distribution data is necessary, causing the structure of the apparatus to be made larger.

SUMMARY OF THE INVENTION

An object of this invention is to provide an image input apparatus which can always precisely and adequately identify a specified original whose image input is to be inhibited and which can be made small.

The above object can be attained by an image input apparatus for inputting a color image, including: storage means for storing a plurality of items of reference color data respectively corresponding to a plurality of color images of a specific original; means for reading a plurality of color images of an original to be processed; means for segmenting a color image read by the reading means into a plurality of areas; means for extracting a plurality of items of color data included in each of the plurality of areas segmented by the segmenting means, each of the plurality of items of color data including a plurality of color components; means for transforming the items of color data extracted by the extracting means into a single color data to form transformed image data; means for comparing the transformed image data generated by the transforming means with the plurality of items of reference data stored in the storage means; means for identifying a kind of the color image on the original read out by the reading means based on a comparison result by the comparing means; and means for inhibiting the output of a color image read by the reading means when the original read by the reading means is identified as the specific original in accordance with a result obtained by the identifying means.

Another image input apparatus for inputting a color image, including: storage means for storing a plurality of items of reference color data respectively corresponding to a plurality of color images of a specific original; means for reading a plurality of color images of an original to be processed; means for segmenting a color image read by the reading means into a plurality of areas; means for extracting a plurality of items of color data included in each of the plurality of areas segmented by the segmenting means, each of the plurality of items of color data including a plurality of color components; means for transforming the items of color data extracted by the extracting means into a single color data to form transformed image data; means for comparing the transformed image data generated by the transforming means with the plurality of items of reference data stored in the storage means; means for identifying a kind of the color image on the original read out by the reading means based on a comparison result by the comparing means; and means for outputting a color image different from a color image on the original read by the reading means when the original read by the reading means is identified as the specific original in accordance with a result obtained by the identifying means.

Still another image input apparatus of this invention includes reading means for reading a color image on an original containing color data; extracting means for extracting a specified area from the color image read by the reading means; converting means for converting an image of specified area extracted by the extracting means into color data items corresponding to the brightness, hue and chroma of the image; storing means for storing color data items indicating the reference brightness, hue and chroma; means for comparing the color data of the brightness, hue and chroma converted by the converting means with the color data of the reference brightness, hue and chroma stored in the storing means; identifying means for identifying the original read by the reading means based on the result of comparison by the comparing means; and inhibiting means for inhibiting output of an image read by the reading means when it is identified that the original is a specified type of original based on the result of identification by the identifying means.

Further, another image input apparatus of this invention includes reading means for reading a color image on an original containing color data; extracting means for extracting a specified area from the color image read by the reading means; converting means for converting an image of specified area extracted by the extracting means into color data items corresponding to the brightness, hue and chroma of the image; storing means for storing color data items indicating the reference brightness, hue and chroma; means for comparing the color data of the brightness, hue and chroma converted by the converting means with the color data of the reference brightness, hue and chroma stored in the storing means; identifying means for identifying the original read by the reading means based on the result of comparison by the comparing means; and output means for outputting an image different from the image on the original read by the reading means when it is identified that the original is a specified type of original based on the result of identification by the identifying means.

According to this invention with the above construction, it becomes possible to attain identification of high precision by comparing the color pattern of a specified original such as a bill with the reference color pattern, for example. Further, even if the image input condition varies, occurrence of problems can be prevented by normalizing the color image of the specified area to a preset size. In addition, the influence given by a deviation in the position of detection can be eliminated by smoothing or averaging the color image after normalization, for example. Therefore, it is possible to always precisely and adequately identify a specified original such as a bill whose image input is to be inhibited.

Further, a dictionary of image patterns (reference color pattern data) can be made smaller in scale in comparison with a case of the conventional identifying method based on the frequency distribution of color image, and since storing means for storing frequency distribution data is not necessary, the size of the apparatus can be reduced.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a block diagram schematically showing the construction of an image input apparatus according to one embodiment of this invention;

FIG. 5 is a diagram showing an example of image data output by the original image extraction section;

FIG. 6 is a block diagram showing the construction of the original image extraction section;

FIG. 12 is a diagram showing an example of the array of one color component data item of color image data output by the normalization section with the size thereof kept constant;

FIG. 14 is a block diagram showing the construction of the normalization section;

FIG. 15 is a diagram showing positions of sampling points in which an image smoothing or averaging section samples;

FIG. 16 is a diagram showing the weights of neighboring pixels subjected to the smoothing or averaging process by the image smoothing section;

FIG. 17 is a diagram showing one example of the processing result which the image smoothing section outputs;

FIG. 18 is a diagram showing an example of the array of data stored in the image smoothing section as the processing result;

FIG. 20 is a conceptional diagram showing the brightness, hue and chroma converted by a brightness-hue-chroma converting section;

FIG. 21 is a construction diagram of a neural network in the brightness-hue-chroma converting section;

FIG. 22 is a diagram for illustrating a learning method of the neural network;

FIG. 23 is a diagram showing an example of data used in the learning method of the neural network;

FIG. 24 is a block diagram showing the construction of the brightness-hue-chroma converting section;

FIG. 25 is a diagram showing an example of a color image to be identified by a pattern matching section;

FIG. 26 is a diagram showing an example of one category of dictionary data used in the pattern matching section;

FIG. 27 is a diagram showing an example of the array of dictionary data stored in a dictionary data storing section;

FIG. 28 is a diagram showing an example of the array of dictionary data at the time of identification of a bill;

FIG. 30 is a block diagram showing another construction of the pattern matching section;

FIG. 31 is a block diagram schematically showing the construction of an image input apparatus according to another embodiment of this invention;

FIG. 32 is a diagram showing an example of the array of dictionary data at the time of identification of a bill;

FIG. 34 is a diagram showing an example of image data different from input image data stored in an image data storing section in the image output controlling section of FIG. 33.

DETAILED DESCRIPTION OF THE PREFERRED EMBODIMENTS

Figure 2:
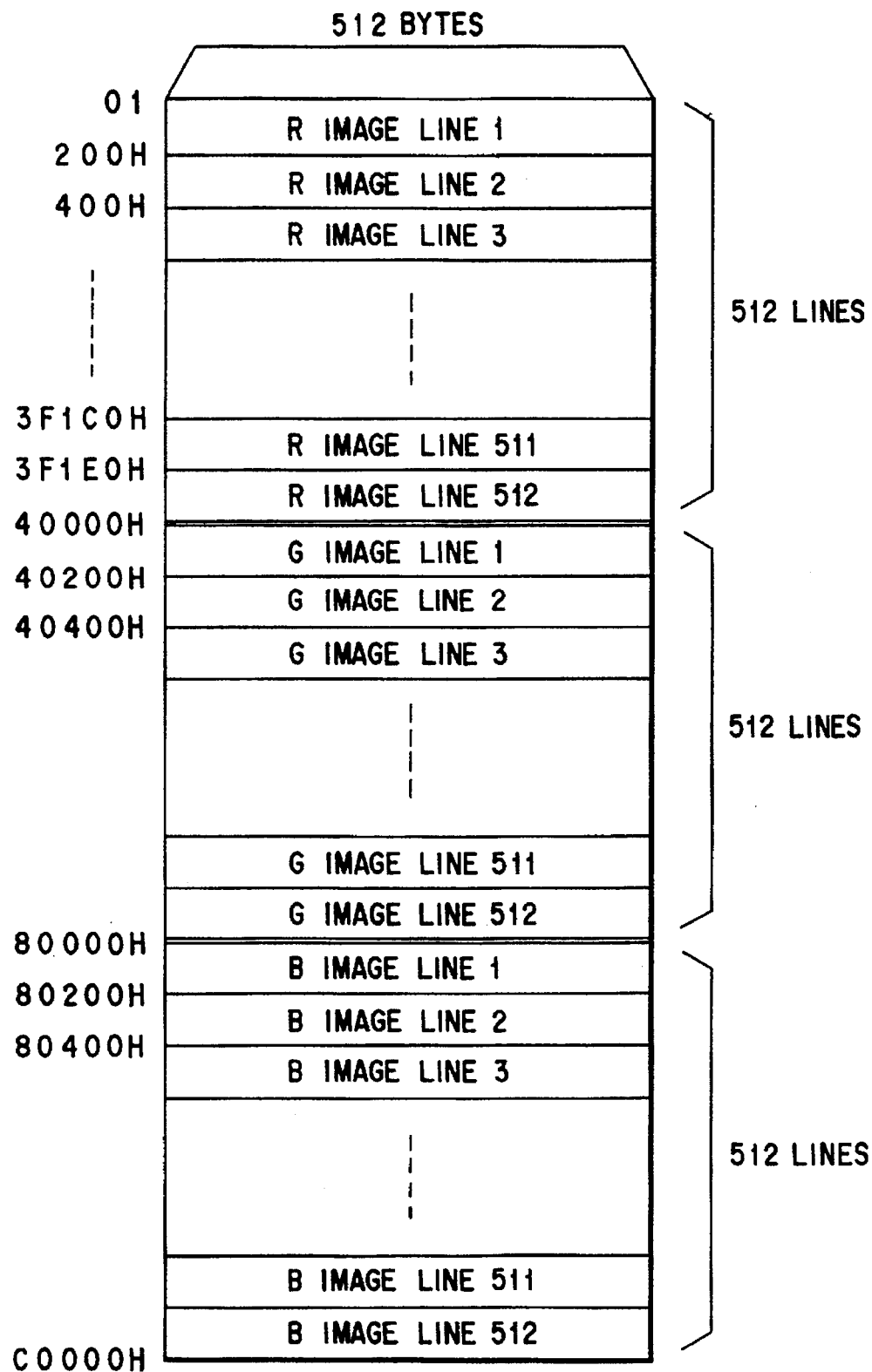
FIG. 2 is a diagram showing an example of the array of color image data stored in an image data storing section.

There will now be described an embodiment of this invention with reference to the accompanying drawings.

FIG. 1 schematically shows the construction of an image input apparatus for inputting a color image on an original in a digital color copying machine according to one embodiment of this invention, for example, and includes a color line sensor 101 used as reading means, color image input section 102, image data storing section 103, original image extracting section 104 used as area extracting means, normalization section 105 used as first converting means, image smoothing section 106 used as second converting means, brightness-hue-chroma converting section 107 used as third converting means, dictionary data storing section 108 used as reference color data storing means, pattern matching section 109 used as identifying means, and image output controlling section 110 used as inhibiting means for inhibiting output of image data or output means for outputting image data.

Suppose that an original P which is a reading object whose image is read is set in a reading area (image reading range) 112 of the color line sensor 101 which is mounted on a carriage 111 and moved in a direction indicated by an arrow in the drawing.

The above sections are explained in detail below.

The color line sensor 101 reads a color image in the reading area 112 and converts the same into an electrical signal. The read color image is converted into a digital form via the color image input section 102 and stored into the image data storing section 103. In this embodiment, the color image is stored in the image data storing section 103 in a memory array shown in FIG. 2 with the R (red), G (green) and B (blue) images (which are hereinafter simply referred to as RGB images) each having 512 pixels in the horizontal direction and 512 pixels in the vertical direction and each pixel constructed by one byte.

Figure 3:
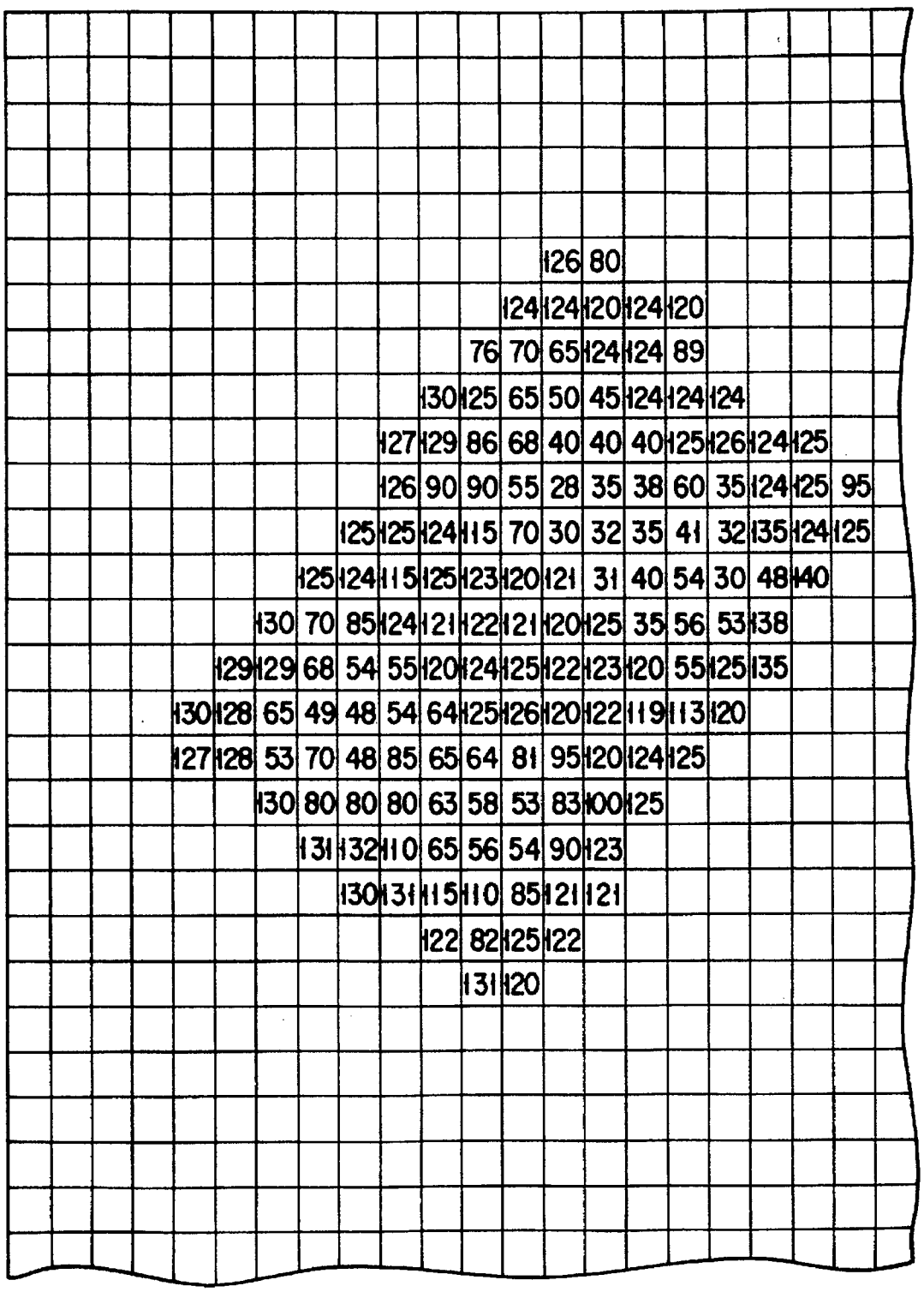
FIG. 3 is a diagram showing an example of the array of one color component data item of color image data stored in the image data storing section.
Figure 4:
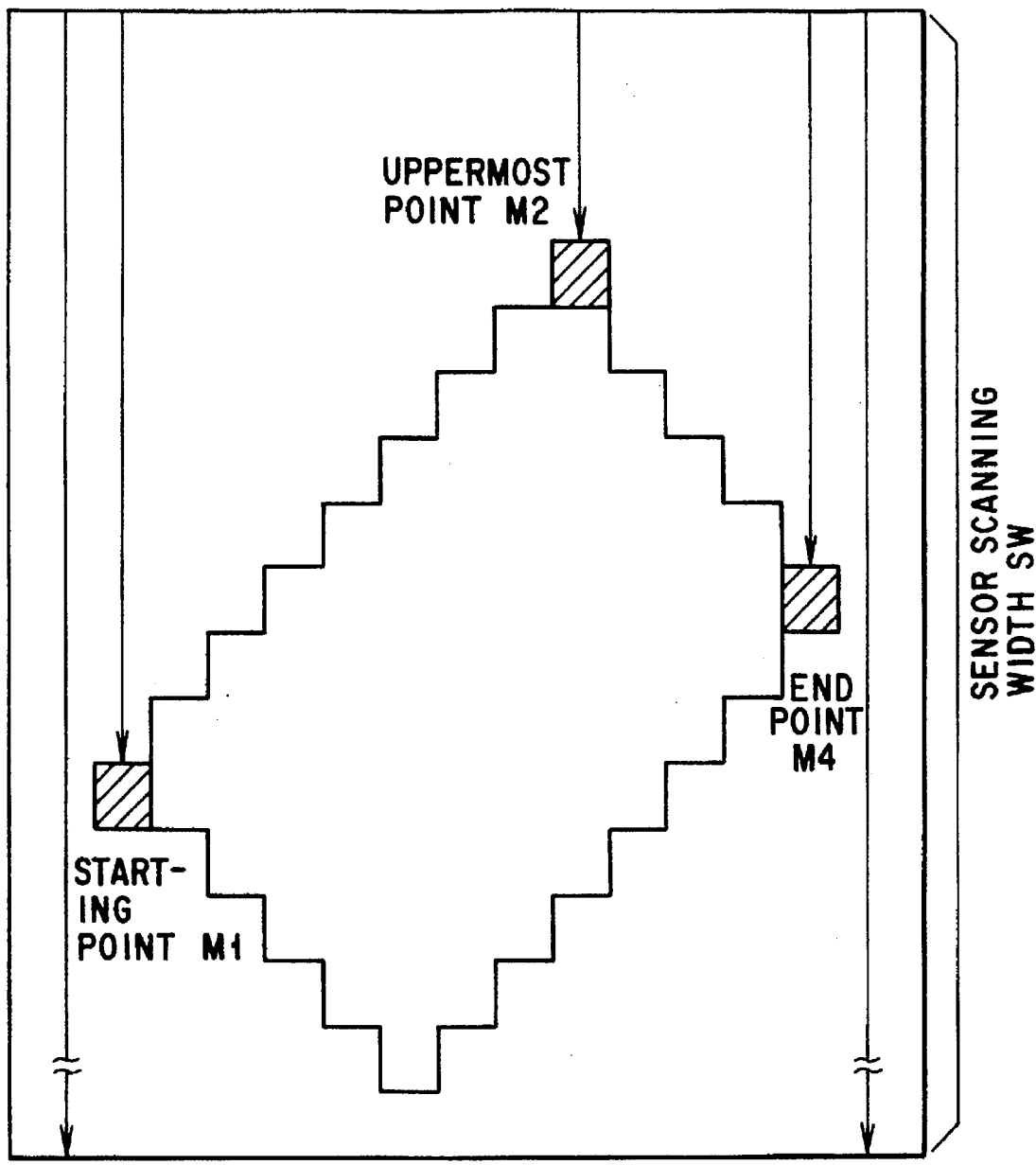
FIG. 4 is a conceptional diagram showing an example of the arrangement of three end points detected by an original image extraction section.

The original image extracting section 104 specifies the range of the original P for RGB image data stored in the image data storing section 103. That is, the original image extracting section 104 subjects one color component, for example, G component image data (FIG. 3) among the RGB image data stored in the format shown in FIG. 2 to the threshold process by use of a preset value THR (for example, 5), detects coordinate data items of the starting point M1, uppermost point M2 and end point M4 of a binary image as shown in FIG. 4, extracts an image while effecting the image rotation compensation, and outputs upright image data as the result of extraction of G image shown in FIG. 5, for example. The pixels shown in FIG. 3 in which no numeral is described take a value "0" and represent the area in which the original P is not present.

The original image extracting section 104 can be realized by the construction as shown in FIG. 6, for example. That is, RGB image data items are read out from the image data storing section 103 according to an address signal ADR1 output from a buffer control circuit 601 and respectively written into an R image buffer 603, G image buffer 602, and B image buffer 604. At the same time, a threshold value processing section 605 effects the threshold process for the G image data for setting the pixels having a value equal to or larger than the constant value THR to "1" and setting the other pixels to "0".

After this, an end point coordinate storing section 607, starting point coordinate storing section 608 and uppermost point coordinate storing section 609 hold an address signal ADR1 obtained when a pixel of "1" is first detected by the threshold value processing section 605 and the coordinate values corresponding to the front ends of arrows indicated in FIG. 4 in the main scanning direction and sub-scanning direction of the line sensor 101 are derived for each scanning line.

The starting point coordinate storing section 608 stores the first end point M1 (x1, y1) whose coordinate value in the main scanning direction is equal to or smaller than the sensor scanning width (the main scanning width of the line sensor 101) SW, the uppermost point coordinate storing section 609 stores the uppermost point M2 (x2, y2) whose coordinate value in the main scanning direction is the smallest one of those which are equal to or smaller than the sensor scanning width SW, and the end point coordinate storing section 607 stores the last end point M4 (x4, y4) whose coordinate value in the main scanning direction is equal to or smaller than the sensor scanning width SW. By use of the coordinate values of the above three points, the coordinate transformation parameter calculating section 610 derives parameters for coordinate transformation such as the affine transformation used for extracting an original image from the input image.

Figure 7:
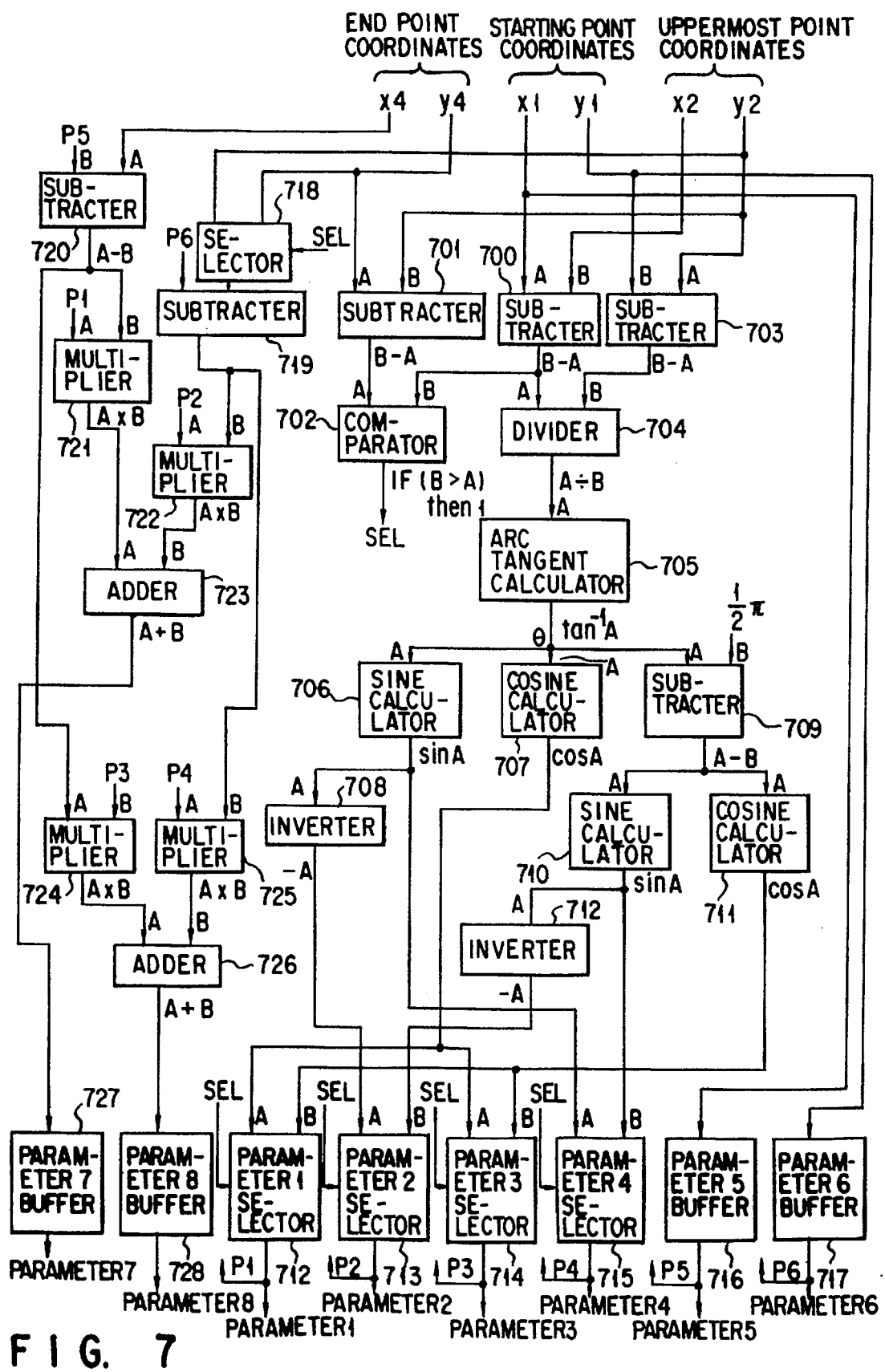
FIG. 7 is a block diagram showing the construction of a coordinate transformation parameter calculating section in the original image extraction section.

The coordinate transformation parameter calculating section 610 derives eight parameters for coordinate transformation with the construction shown in FIG. 7, for example. In order to simplify the explanation, FIG. 7 is explained in combination with terms of equations. A subtracter 700 derives a difference between the coordinate value x1 of the starting point and the coordinate value x2 of the uppermost point, a subtracter 701 derives a difference between the coordinate value y4 of the end point and the coordinate value y2 of the uppermost point, and a comparator 702 compares the two different values.

Figure 8:
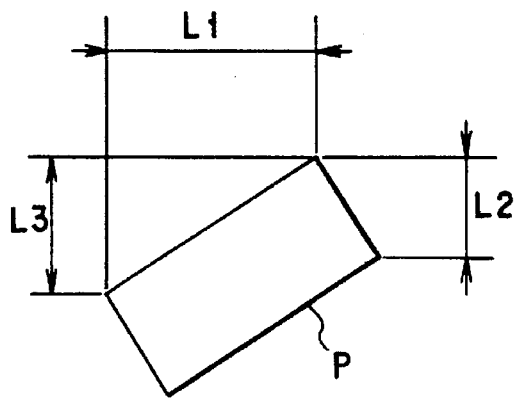
FIG. 8 is a conceptional diagram showing the length of one side of an original to be measured by the original image extraction section.
Figure 9:
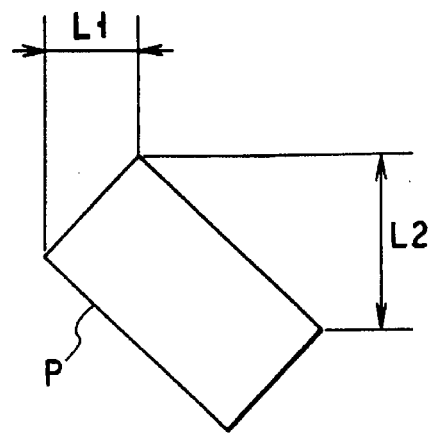
FIG. 9 is a conceptional diagram showing the length of one side of an original to be measured by the original image extraction section.

Derivation of the two difference values is equal to derivation of the two lengths L1 and L2 of the original P as shown in FIGS. 8 and 9, and by comparing the two values by use of the comparator 702, whether the long side of the original P corresponds to the length L1 (that is, FIG. 8) or the short side thereof corresponds to the length L1 (that is, FIG. 9) is determined and then a selection signal SEL is output.

Figure 10:
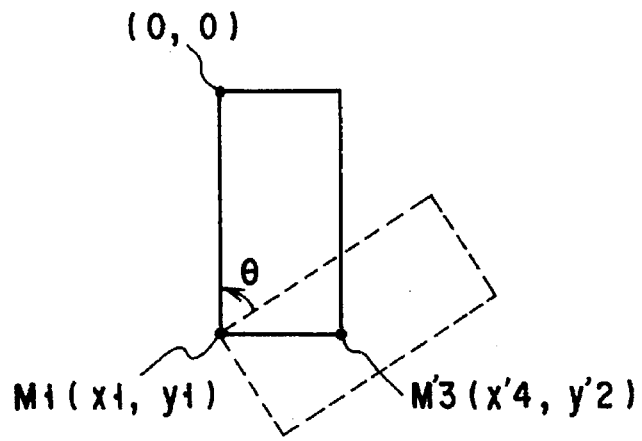
FIG. 10 is a conceptional diagram showing the rotation of an image effected by the original image extraction section.
Figure 11:
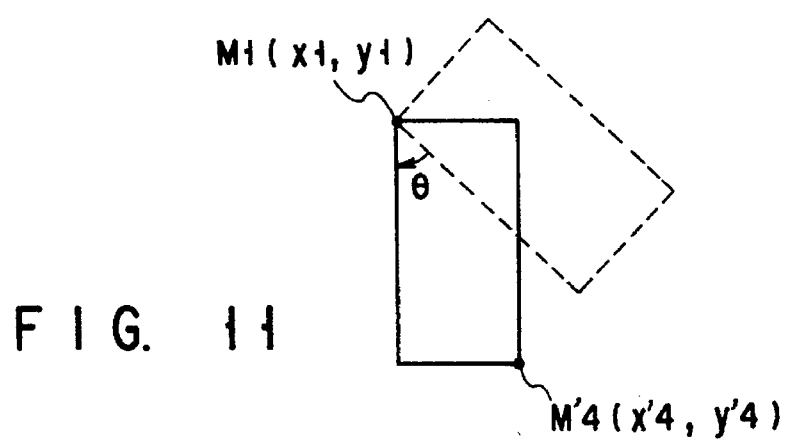
FIG. 11 is a conceptional diagram showing the rotation of an image effected by the original image extraction section.

In order to cope with the two cases shown in FIGS. 8 and 9, the original image data is rotated by an angle $\theta$ and affine transformed into desired image data as shown in FIGS. 10 and 11. In order to derive the rotation angle $\theta$, the subtracter 700 derives the length L1 of FIG. 8, the subtracter 703 derives the length L3 of FIG. 8 based on the coordinate values of the starting point and the uppermost point, and the following calculation is effected by use of a divider 704 and arc tangent calculating or operating unit 705.

$$\theta = \tan^{-1}(L1/L3) \quad (1)$$

The arc tangent calculator 705 can be realized by an analytical repetitive structure such as the Taylor expansion which is known in the art or a construction for reading out a look-up table in which previously calculated values are stored. By using the angle $\theta$, a sine calculator 706 derives $\sin\theta$, a cosine calculator 707 derives $\cos\theta$, and a sign inverter 708 derives $-\sin\theta$. Rotation by the angle $\theta$ around the end point M1 (x1, y1) shown in FIG. 10 is to transform a point (x, y) coordinates to these (x', y') by calculation based on the following equation (2) and derives parameters necessary for the conversion.

$$\begin{bmatrix} x' \\ y' \end{bmatrix} = \begin{bmatrix} \cos\theta & -\sin\theta \\ \sin\theta & \cos\theta \end{bmatrix} \begin{bmatrix} x - x1 \\ y - y1 \end{bmatrix} \quad (2)$$

The conversion of FIG. 11 can be realized by the following equation (3), and parameters of the variable matrix are derived as $\sin(\theta-\pi/2)$ by a sine operating unit 710 via a subtracter 709, as $\cos(\theta-\pi/2)$ by a cosine operating unit 711, and as $-\sin(\theta-\pi/2)$ by a sign inverter 712.

$$\begin{bmatrix} x' \\ y' \end{bmatrix} = \begin{bmatrix} \cos(\theta-\pi/2) & -\sin(\theta-\pi/2) \\ \sin(\theta-\pi/2) & \cos(\theta-\pi/2) \end{bmatrix} \begin{bmatrix} x - x1 \\ y - y1 \end{bmatrix} \quad (3)$$

The comparator 702 selects a case of the equation (2) or the equation (3), and a parameter 1 selector 712, parameter 2 selector 713, parameter 3 selector 714 and parameter 4 selector 715 select and output corresponding parameters of the variable matrix. At the same time, a parameter 5 buffer 716 and parameter 6 buffer 717 output coordinate values of the rotation center.

Further, the coordinate transformation parameter calculating section 610 also derives the image range of an object to be converted. That is, when considering the range of a transformed image, the range is set from a point (0, 0) to a point (x4', y2') in the case of FIG. 10 and is set from a point (0, 0) to a point (x4', y4') in the case of FIG. 11. With the construction of FIG. 7, y2 or y4 is selected by the selector 718, the image range (x4', y2') or (x4', y4') is derived according to the transformation equation of the equation (2) or (3) by use of subtracters 719, 720, multipliers 721, 722, 724, 725, and adders 723, 726, and the image range is output from a parameter 7 buffer 727 and parameter 8 buffer 728.

Thus, the coordinate transformation parameter calculating section 610 outputs six parameters necessary for coordinate transformation and two parameters of transformation range.

Based on the above result, the buffer controlling section 611 generates an address signal ADR1' for reading an image subjected to the coordinate transformation in a specified range, writes G image data read out from the G image buffer 602 into the G image buffer 612, writes R image data read out from the R image buffer 603 into the R image buffer 613, and writes B image data read out from the B image buffer 604 into the B image buffer 614 according to the address signal ADR1'. In this case, image data of one color component shown in FIG. 3 is subjected to the rotational compensation and positional compensation and stored in the form shown in FIG. 5.

Further, the image range derived by the coordinate transformation parameter calculating section 610 is output from an image area outputting section 615 with the starting point set as (xss, yss) and the end point set as (xse, yse).

Next, in the normalization section 105, coordinate data items xss, yss, xse, yse indicating the range of image data output from the original image extracting section 104 are used to normalize the size of the image data in the range. That is, for example, in order to normalize color images hr (x, y), hg (x, y), hb (x, y) of the original P to respective images mr (x, y), mg (x, y), mb (x, y) having xst pixels in the vertical direction and yst in the horizontal direction, conversion by the following equation (4) is effected.

$$mr((x-xss)*xst/(xse-xss+1),(y-yss)*yst/(yse-yss+1)) = hr(x,y)$$

$$mg((x-xss)*xst/(xse-xss+1),(y-yss)*yst/(yse-yss+1)) = hg(x,y)$$

$$mb((x-xss)*xst/(xse-xss+1),(y-yss)*yst/(yse-yss+1)) = hb(x,y) \quad (4)$$

where x=xst~xse, y=yst~yse

Figure 13:
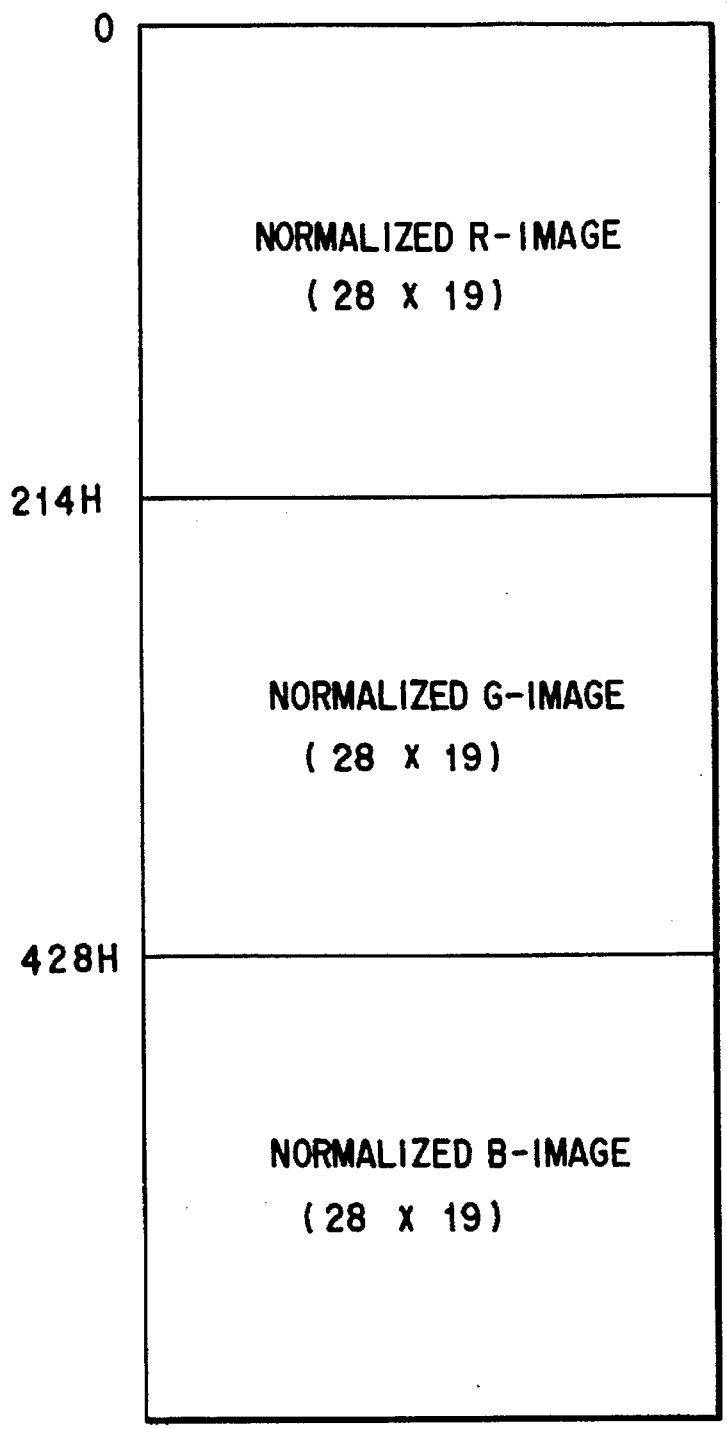
FIG. 13 is a diagram showing an example of the array of data stored by the normalization section as the processing result.

For example, if image data of one color component among the RGB images as shown in FIG. 5 is normalized with yst set to 28 and xst set to 19 based on coordinate data items xss, xse, yss, yse of the original P extracted by the original image extracting section 104, normalized image data as shown in FIG. 12 is obtained. The same process is effected for each of three component images of RGB and images are stored in the normalization section 105 in the data format as shown in FIG. 13.

The normalization section 105 can be realized with construction shown in FIG. 14, for example. That is, an address signal ADR5 output from a buffer control section 1501 is converted into an address signal ADR4 indicated as a coordinate value in the equation (4) by an address converting section 1502, and RGB image data corresponding to the address is read out from the original extracting section 104 based on the address signal ADR4, specified by a new address signal ADR5 and written into the R image buffer 1503, G image buffer 1504, and B image buffer 1505.

Next, in the image smoothing section 106, the RGB images normalized in the normalization section 105 are converted into RGB images of averaged or smoothed small pixel structure. That is, 5×5 smoothed data with neighboring pixels multiplied by weights indicated in FIG. 16 is derived for the normalized RGB images derived from the normalization section 105 in each of 70 sampling points indicated by numbers in FIG. 15 so as to create a smoothed image with 7 pixels in the horizontal direction and 10 pixels in the vertical direction.

Figure 15:
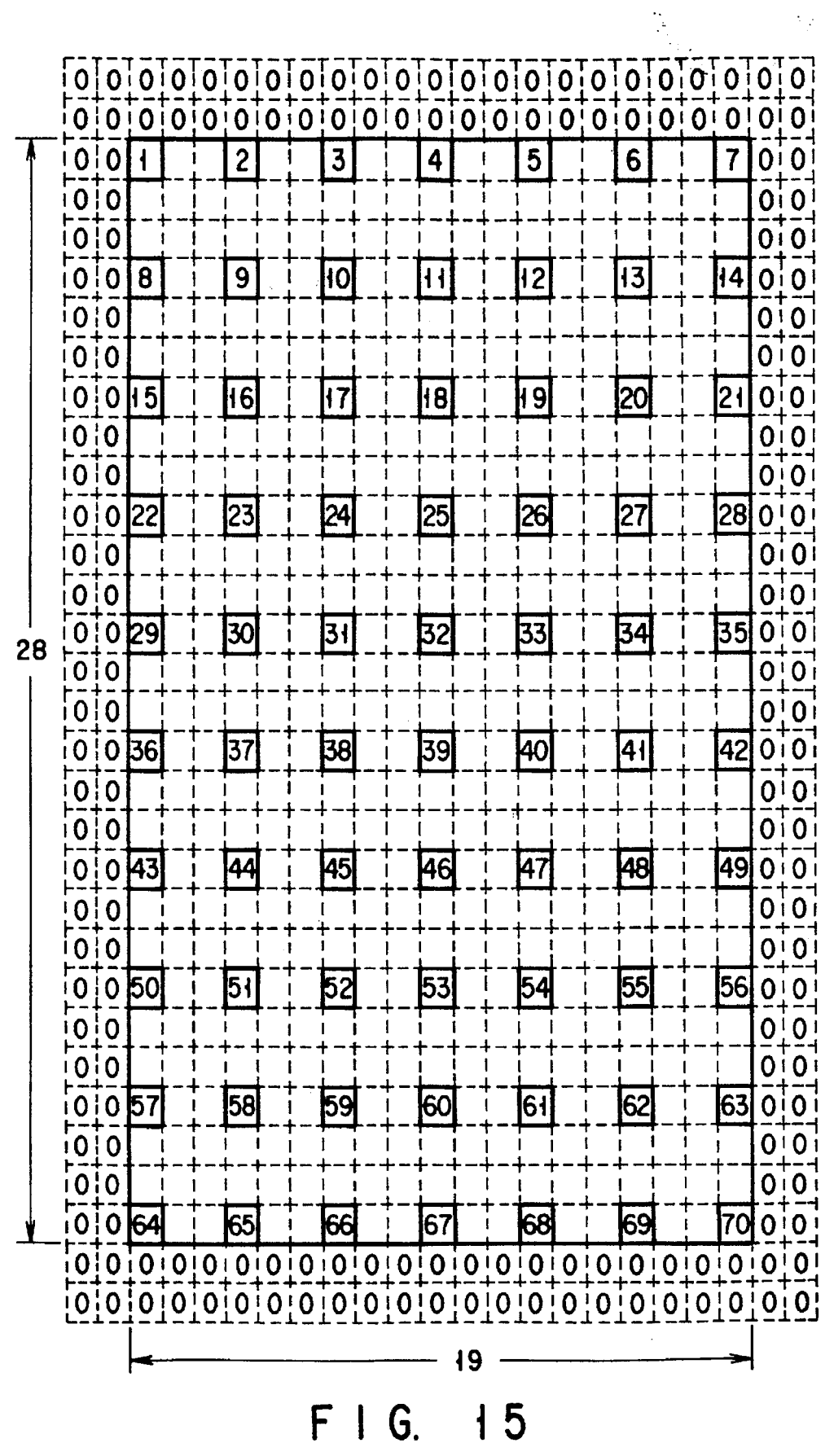

At this time, the smoothing range of the end points among the sampling points of FIG. 15 contains an area other than the image sampling data, but data of two pixels in the peripheral portion is treated as a pixel value "0" as shown in FIG. 15. Further, the result of calculation for each pixel is divided by the total sum "18" of weighting coefficients of pixels and output. As the result of the smoothing process, for example, a smoothed image as shown in FIG. 17 can be obtained for the samples of FIG. 12. The smoothed image is respectively derived for RGB and the image data is stored into the image smoothing section 106 in the form shown in FIG. 18.

Figure 19:
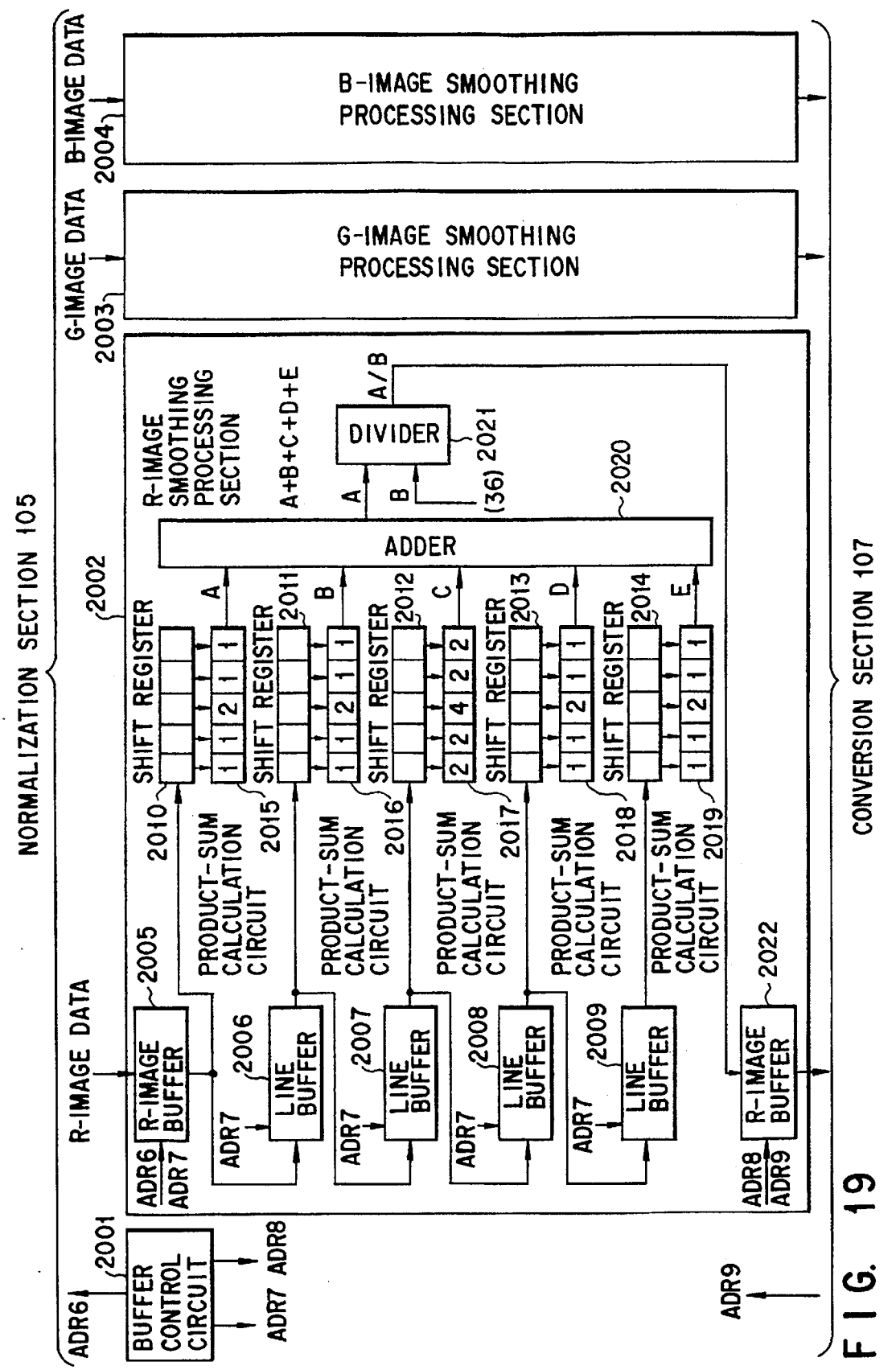
FIG. 19 is a block diagram showing the construction of the image smoothing section.

The image smoothing section 106 can be realized with the construction shown in FIG. 19, for example. The image smoothing section 106 is constructed by three processing sections of R image smoothing processing section 2002, G image smoothing processing section 2003, and B image smoothing processing section 2004, but since the three processing sections have the same construction, the R image smoothing processing section 2002 which is one of them is explained as an example in detail. Normalized R image data is read out from the normalization section 105 according to an address signal ADR6 output from the buffer control section 2001 and written into the R image buffer 2005. At this time, as shown in FIG. 15, the image is stored with the peripheral pixels set as "0".

Next, the buffer control section 2001 creates an address signal ADR7 corresponding to one pixel, reads out image data from the R image buffer 2005 based on the address signal ADR7 and effects calculations for neighboring pixels of FIG. 16 for each pixel by use of line buffers 2006, 207, 2008, 2009, shift registers 2010, 2011, 2012, 2013, 2014, product-sum calculating units 2015, 2016, 2017, 2018, 2019 for multiplying outputs of the shift registers by the weighting coefficients shown in the drawing and accumulating the results of multiplication, adder 2020 for adding the output values of the calculating units, and divider 2021.

In synchronism with the address signal ADR7 for controlling the above operation, the buffer control section 2001 creates an address signal ADR8 corresponding to sampling points specified at 70 points in FIG. 15 and writes only smoothed data of the sampling point into the R image buffer 2022.

Next, in the brightness-hue-chroma converting section 107, the RGB image with 7 pixels in the horizontal direction and 10 pixels in the vertical direction is converted into a value obtained by representing the H (hue), V (brightness) and C (chroma) values (which are hereinafter referred to simply as HVC values) of correction Munsell color system which are widely used as color perception amounts of a human being on the rectangular coordinates. That is, color image data (which is hereinafter referred to as Vcd value) is represented by use of the brightness V and values c and d obtained by converting an HC value of polar coordinate creating a hue-chroma plane as shown in FIG. 20 by use of the following equation (5).

$$c = \cos H \times C + 128$$

$$d = \sin H \times C + 128 \quad (5)$$

The conversion structure is constructed by a neural network formed of at least three layers as shown in FIG. 21, for example, to convert RGB values input to an input layer into Vcd values, and repetitive learning processes are effected to suppress the conversion error to a preset value or less by using data indicating the relation between RGB values and HVC values as shown in FIG. 23 in the construction including a Munsell converting section 3201, arithmetic operating section 3202 and neural network 3203 shown in FIG. 22.

For example, in a 3-layered neural network having an intermediate layer formed of 17 units, an input layer formed of 3 units corresponding to RGB values and an output layer formed of 3 units corresponding to Vcd values, data indicating the relation between RGB values and Vcd values obtained by converting HVC values into rectangular coordinate values based on data indicating the relation between xyz values and HVC values shown in JIS Z8271 is used as learning data, learning processes are repeatedly effected until the average error of conversion becomes 0.5 NBS, then the value converges after the processes are effected by approx. 10,000 times.

The brightness-hue-chroma converting section 107 converts an RGB color image having 7 pixels in the horizontal direction and 10 pixels in the vertical direction and output from the image smoothing section 106 into a Vcd image having 7 pixels in the horizontal direction and 10 pixels in the vertical direction and stores the result.

The brightness-hue-chroma converting section 107 can be realized by the construction as shown in FIG. 24, for example. That is, a buffer control section 2501 creates an address signal ADR9 and reads out RGB image data from the image smoothing section 106 based on the address signal ADR9. The readout image data is subjected to the arithmetic operation by means of 17 product-sum calculating units 2502, 2503, - - -, 2504 constructing the intermediate layer of the neural network, 17 sigmoid function calculation units 2505, 2506, - - -, 2507, product-sum calculating units 2508, 2509, 2510 constructing the output layer, and sigmoid function calculation units 2511, 2512, 2513 and the results of calculation are respectively stored in V image buffer 2514, c image buffer 2515 and d image buffer 2516.

In this case, weighting coefficients of the neural network which are previously learned as shown in FIG. 22 are given to the product-sum calculating units of the intermediate layer and output layer.

Next, the Vcd image converted in the brightness-hue-chroma converting section 107 and dictionary data Vcd stored in the dictionary data storing section 108 are compared with each other in the pattern matching section 109 to select a pattern having the highest matching degree. As the pattern comparing method, a method for deriving the similarity of a 7×10 pattern with respect to dictionary data is used. The similarity is derived by subjecting the Vcd images Vs(i), cs(i), ds(i) [i=0, 1, - - -, 69] of the sample and Vcd images vd(i), cd(i), dd(i) [i=0, 1, - - -, 69] of the dictionary data to the operation of the following equation (6).

$$SimV = \sum_{i=0}^{69} (Vs(i) \times Vd(i)) / \sqrt{\sum_{i=0}^{69} Vs(i)^2 \times \sum_{i=0}^{69} Vd(i)^2} \quad (6)$$

$$Simc = \sum_{i=0}^{69} (cs(i) \times cd(i)) / \sqrt{\sum_{i=0}^{69} cs(i)^2 \times \sum_{i=0}^{69} cd(i)^2}$$

$$Simd = \sum_{i=0}^{69} (ds(i) \times dd(i)) / \sqrt{\sum_{i=0}^{69} ds(i)^2 \times \sum_{i=0}^{69} dd(i)^2}$$

Finally, the following equation (7) is derived.

$$Sim = \sqrt{SimV^2 + Simc^2 + Simd^2} \quad (7)$$

For example, the similarity Simv between a V image among the Vcd images shown in FIG. 25 and dictionary data V shown in FIG. 26 is derived as follows.

$Simv =$
$(6 \times 7 + 13 \times 15 + 13 \times 15 + 13 \times 15 + 13 \times 15 + 13 \times 17 + 6 \times 7 +$
$9 \times 10 + 17 \times 18 + 21 \times 23 + 26 \times 27 + 31 \times 33 + 30 \times 32 + 17 \times 18 +$
$9 \times 10 + 17 \times 18 + 32 \times 35 + 45 \times 47 + 52 \times 53 + 57 \times 59 + 28 \times 20 +$
$10 \times 11 + 24 \times 26 + 35 \times 38 + 42 \times 45 + 66 \times 70 + 81 \times 83 + 28 \times 29 +$
$12 \times 13 + 30 \times 31 + 41 \times 43 + 52 \times 55 + 88 \times 91 + 119 \times 121 + 35 \times 36 +$
$14 \times 15 + 32 \times 33 + 45 \times 48 + 55 \times 57 + 91 \times 96 + 125 \times 127 + 30 \times 37 +$
$11 \times 12 + 25 \times 28 + 51 \times 53 + 55 \times 57 + 118 \times 121 + 121 \times 124 + 31 \times 32$
$+$
$11 \times 12 + 27 \times 29 + 44 \times 46 + 45 \times 48 + 59 \times 61 + 64 \times 65 + 23 \times 32 +$
$9 \times 10 + 15 \times 17 + 15 \times 17 + 15 \times 17 + 15 \times 17 + 17 \times 19 + 12 \times 24 +$
$6 \times 7 + 13 \times 15 + 13 \times 15 + 13 \times 15 + 13 \times 15 + 13 \times 15 + 6 \times 7) /$
$((6 \times 6 + 13 \times 13 + 13 \times 13 + 13 \times 13 + 13 \times 13 + 13 \times 13 + 6 \times 6 +$
$9 \times 9 + 17 \times 17 + 21 \times 21 + 26 \times 26 + 31 \times 31 + 30 \times 30 + 17 \times 17 +$
$9 \times 9 + 17 \times 17 + 32 \times 32 + 45 \times 45 + 52 \times 52 + 57 \times 57 + 28 \times 28 +$
$10 \times 10 + 24 \times 24 + 35 \times 35 + 42 \times 42 + 66 \times 66 + 81 \times 81 + 28 \times 28 +$
$12 \times 12 + 30 \times 30 + 41 \times 41 + 52 \times 52 + 88 \times 88 + 119 \times 119 + 35 \times 35 +$
$14 \times 14 + 32 \times 32 + 45 \times 45 + 55 \times 55 + 91 \times 91 + 125 \times 125 + 30 \times 30 +$
$11 \times 11 + 25 \times 25 + 51 \times 51 + 55 \times 55 + 118 \times 118 + 121 \times 121 + 31 \times 31$
$+$
$11 \times 27 + 27 \times 27 + 44 \times 44 + 45 \times 45 + 59 \times 59 + 63 \times 63 + 23 \times 23 +$
$9 \times 9 + 15 \times 15 + 15 \times 15 + 15 \times 15 + 15 \times 15 + 17 \times 17 + 12 \times 12 +$
$6 \times 6 + 13 \times 13 + 13 \times 13 + 13 \times 13 + 13 \times 13 + 13 \times 13 + 6 \times 6)^{1/2} \times$
$(7 \times 7 + 15 \times 15 + 15 \times 15 + 15 \times 15 + 15 \times 15 + 15 \times 15 + 7 \times 7 +$
$10 \times 10 + 18 \times 18 + 23 \times 23 + 27 \times 27 + 33 \times 33 + 32 \times 32 + 18 \times 18 +$
$10 \times 10 + 18 \times 18 + 35 \times 35 + 47 \times 47 + 53 \times 53 + 59 \times 59 + 29 \times 29 +$
$11 \times 11 + 26 \times 26 + 38 \times 38 + 45 \times 45 + 70 \times 70 + 83 \times 83 + 29 \times 29 +$
$13 \times 13 + 31 \times 13 + 43 \times 43 + 55 \times 55 + 91 \times 91 + 121 \times 121 + 36 \times 36 +$
$15 \times 15 + 33 \times 33 + 48 \times 48 + 57 \times 57 + 96 \times 96 + 127 \times 127 + 37 \times 37 +$
$12 \times 12 + 28 \times 28 + 53 \times 53 + 57 \times 57 + 121 \times 121 + 124 \times 124 + 32 \times 32$
$+$
$12 \times 12 + 29 \times 29 + 46 \times 46 + 48 \times 48 + 61 \times 61 + 65 \times 65 + 32 \times 32 +$
$10 \times 10 + 17 \times 17 + 17 \times 17 + 17 \times 17 + 17 \times 17 + 19 \times 19 + 24 \times 24 +$
$7 \times 7 + 15 \times 15 + 15 \times 15 + 15 \times 15 + 15 \times 15 + 15 \times 15 + 7 \times 7)^{1/2})$ In this case, a category having the largest similarity is output as the result of identification.

In the dictionary data storing section 108, a plurality of Vcd image data items obtained by previously collecting image data having each category shown in FIG. 26 and whole categories shown in FIG. 27 and subjecting the same to the normalization and smoothing processes are stored. For example, if the category is set to correspond to the patterns of three types of bills set in different directions as shown in FIG. 28, whether a bill is placed as the original P or not can be determined.

Figure 29:
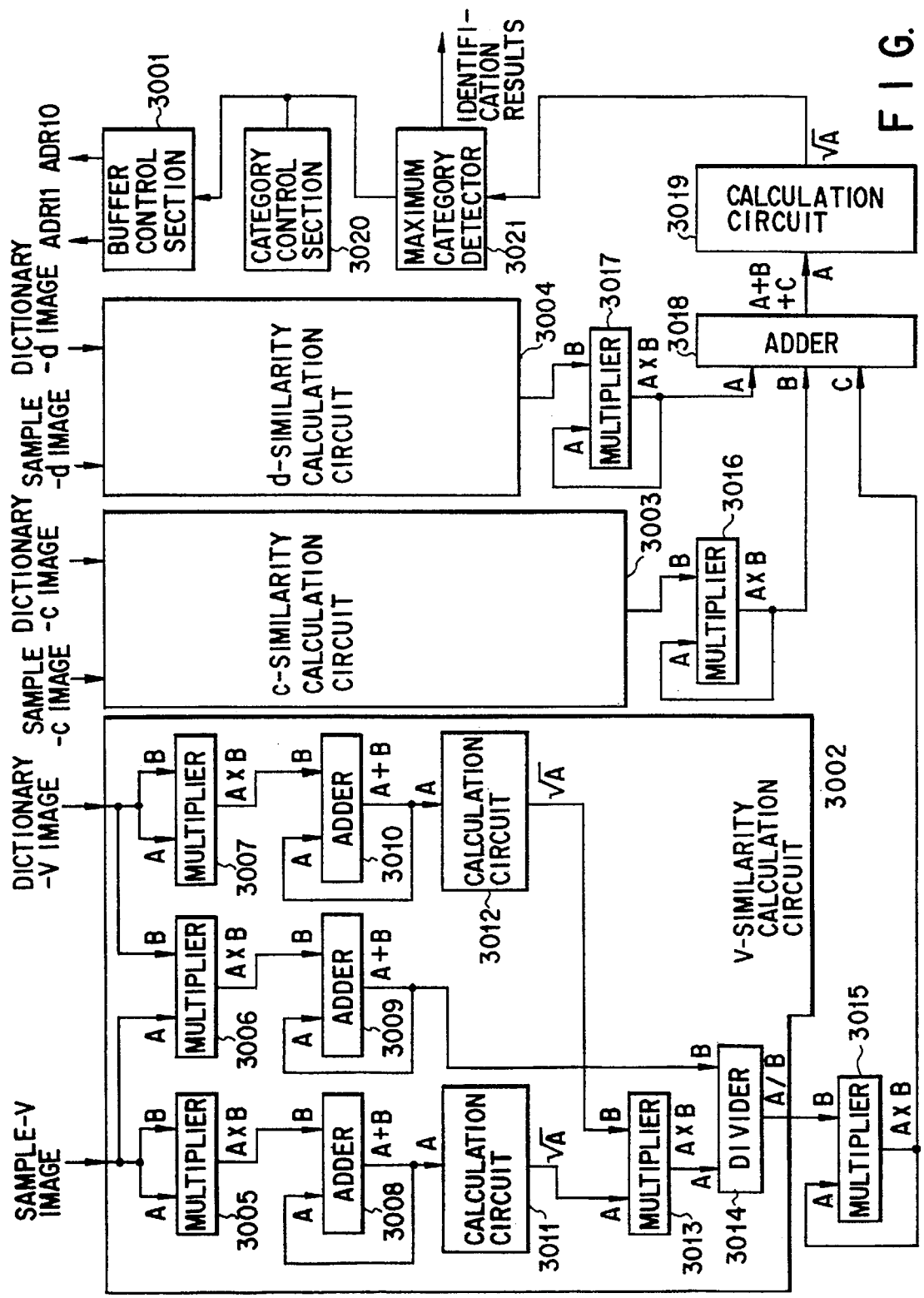
FIG. 29 is a block diagram showing the construction of the pattern matching section.

The pattern matching section 109 can be realized by the construction as shown in FIG. 29, for example. Since the V similarity calculating section 3002, c similarity calculating section 3003 and d similarity calculating section 3004 have the same construction, only the V similarity calculating section 3002 is explained as an example in detail. That is, a buffer control section 3001 simultaneously creates an address signal ADR10 for reading out sample image data from the brightness-hue-chroma converting section 107 and an address signal ADR11 for specifying dictionary data in an area specified by a category control section 3020 and reads out sample image data to be identified and dictionary data based on the address signals ADR10 and ADR11.

In the V similarity calculating section 3002, while a multiplier 3005 is calculating a square value of each pixel of the V image of sample image data, an adder 3008 whose output is input to one of the input terminals thereof accumulates the output of the multiplier 3005. Likewise, a multiplier 3007 calculates a square value of each pixel of the v image of dictionary data and an adder 3010 accumulates the output of the multiplier 3007.

When the buffer control section 3001 completes the operation of reading data of one image, square root calculating units 3011, 3012 derive square roots of respective outputs of the adders 3008, 3010 and a multiplier 3013 derives the product of the results. This corresponds to calculation for the denominator of the equation (6). At the same time, a multiplier 3006 derives the product of the v image of sample image data and the V image of dictionary data for each pixel and an adder 3009 accumulates the products to derive the numerator of the equation (6).

After this, the quotient of an output value of the multiplier 3013 with respect to an output of the adder 3009 is derived by a divider 3014 so as to derive the similarity of the V image.

Likewise, the c similarity calculating section 3003 and d similarity calculating section 3004 respectively derive the c image similarity and d image similarity. Then, the square values of the similarities are derived by multipliers 3015, 3016, 3017, an adder 3018 derives the sum of the three values, a square root calculating unit 3019 derives the square root so as to effect the calculation of the equation (7). The similarity is repeatedly calculated while changing the category of the dictionary and one of the categories which has the largest similarity is output as the result of identification by a maximum category detecting section 3021.

Further, as a modification of the pattern matching section 109, it is possible to derive a color difference between the sample image data and the dictionary data and select one of the dictionary data items which has the nearest pattern. First, the brightness images Vs(i) and Vd(i) of the sample image data and the dictionary data are normalized for brightness with the maximum values in the image set to Vsmax, Vdmax and the minimum values in the image set to Vsmin, Vdmin. This is achieved by converting the respective images by the following equation (8).

$$Vs'(i)=255\times(Vs(i)-Vsmin)/(Vsmax-Vsmin)$$

$$Vd'(i)=255\times(Vd(i)-Vdmin)/(Vdmax-Vdmin) \quad (8)$$

Thus, the following equation (9) is obtained.

$$dC = \sum_{i=0}^{69} ((Vs'(i) - Vd'(i))^2 + k \times (cs(i) - cd(i))^2 + k \times (ds(i) - dd(i))^2)^{1/2} \quad (9)$$

Then, the accumulated value of the color differences for all of the categories are calculated and the smallest one of them is output as the result of identification. In this case of equation (9), k is a constant determined to calculate the color difference.

The pattern matching section 109 in this embodiment can be realized by the construction as shown in FIG. 29, for example. That is, the buffer control section 3101 simultaneously creates an address signal ADR10 for reading out sample image data from the brightness-hue-chroma converting section 107, an address signal ADR11 for specifying dictionary data of an area specified by a category control section 3125, and an address signal ADR12 for controlling a dictionary V image buffer 3113 and reads out sample image data to be identified and dictionary data based on the address signals ADR10, ADR11 and ADR12.

In order to normalize the concentration, the V image of the sample image data and the V image of the dictionary data are respectively written into the sample V image buffer 3104 and dictionary V image buffer 3113, and at the same time, the maximum and minimum values thereof are derived by the maximum value detecting sections 3102, 3111 and the minimum value detecting sections 3103, 3112. Then, in order to calculate the equation (5), subtracters 3105, 3106, 3114, 3115, multipliers 3107, 3116, dividers 3108, 3117 are arranged as shown in the drawing.

After the maximum and minimum values used for calculating the equation (8) are derived, the buffer control section 3101 outputs an address signal ADR12 for controlling the sample V image buffer 3104 and dictionary V image buffer 3113, an address signal ADR10 for reading out sample c image data from the brightness-hue-chroma converting section 107 and an address signal ADR11 for reading out dictionary data specified by the category controlling section 3125 from the dictionary storing section 108.

Subtracters 3109, 3118, 3119 derive differences between pixels of the c image, d image and normalized V image and multipliers 3110, 3120, 3121 derive square values of the differences. Further, multipliers 3121, 3122 multiply the differences of the c image and d image by the weighting coefficient k. An adder 3123, square root calculating unit 3124 and adder 3126 calculate the total sum of the square values of the deviations of the pixels so as to derive the color difference accumulated value dc of the equation (9). The color difference accumulated value dc is calculated for all of the categories and the smallest one of the categories is detected by the minimum category detecting section 3127 and output as the result of identification.

Finally, the image output controlling section 110 determines whether or not image data output from the color image input section 102 is output to the exterior according to the result of identification output from the pattern matching section 109. In this case, only when the original is identified to be a specified original such as a bill which is inhibited from being copied, the image output controlling section 110 interrupts (inhibits) the image data output from the color image input section 102 from being output to the exterior.

As described above, according to the above embodiment, a color image on the original is input, a partial area of the original is extracted from the input color image, the original area is normalized to a preset size and then converted into a smoothed image, and the smoothed image is converted into Vcd images used as color perception amounts of a human being and collated with preset dictionary data to identify a special original such as a bill which is inhibited from being copied, thus making it possible to identify the original with high precision based on the color pattern.

Thus, a special original such as a bill which is inhibited from being copied can always be detected and identified with high precision.

Further, since it is only necessary to prepare a small image pattern dictionary, the apparatus can be made small in comparison with a case wherein the conventional identification method using the frequency distribution of color images is used, and since the storing means for frequency distribution data is not used, the size of the apparatus can be reduced.

Next, another embodiment of this invention will be explained.

FIG. 31 schematically shows the construction of an image input apparatus according to another embodiment of this invention. Portions which are the same as those of FIG. 1 are denoted by the same reference numerals and the explanation therefor is omitted. This embodiment is similar to the embodiment of FIG. 1 except that the brightness-hue-chroma converting section 107 is omitted, and even in this case, the same operation and effect as those of FIG. 1 can be expected.

That is, a color image in an extraction area 112 is picked up as an RGB image signal by a color line sensor 101, converted into digital RGB image data by a color image input section 102 and stored into an image data storing section 103. The original image extraction section 104 detects positional information of the original P for the image data stored in the image data storing section 103 and extracts RGB image data thereof.

After this, the RGB image data of the original P is normalized to a preset size by a normalization section 105 and converted into a smoothed image by an image smoothing section 106. For example, the smoothed image is compared with RGB smoothed image data of all types of bills stored in a dictionary data storing section 108 with a construction shown in FIG. 32 in a pattern matching section 109 and the result of comparison is output as the result of identification.

In this case, if the original is identified as a specified original such as a bill which is to be inhibited from being copied, the image output controlling section 110 interrupts image data output from the color image input section 102 from being output to the exterior.

Figure 33:
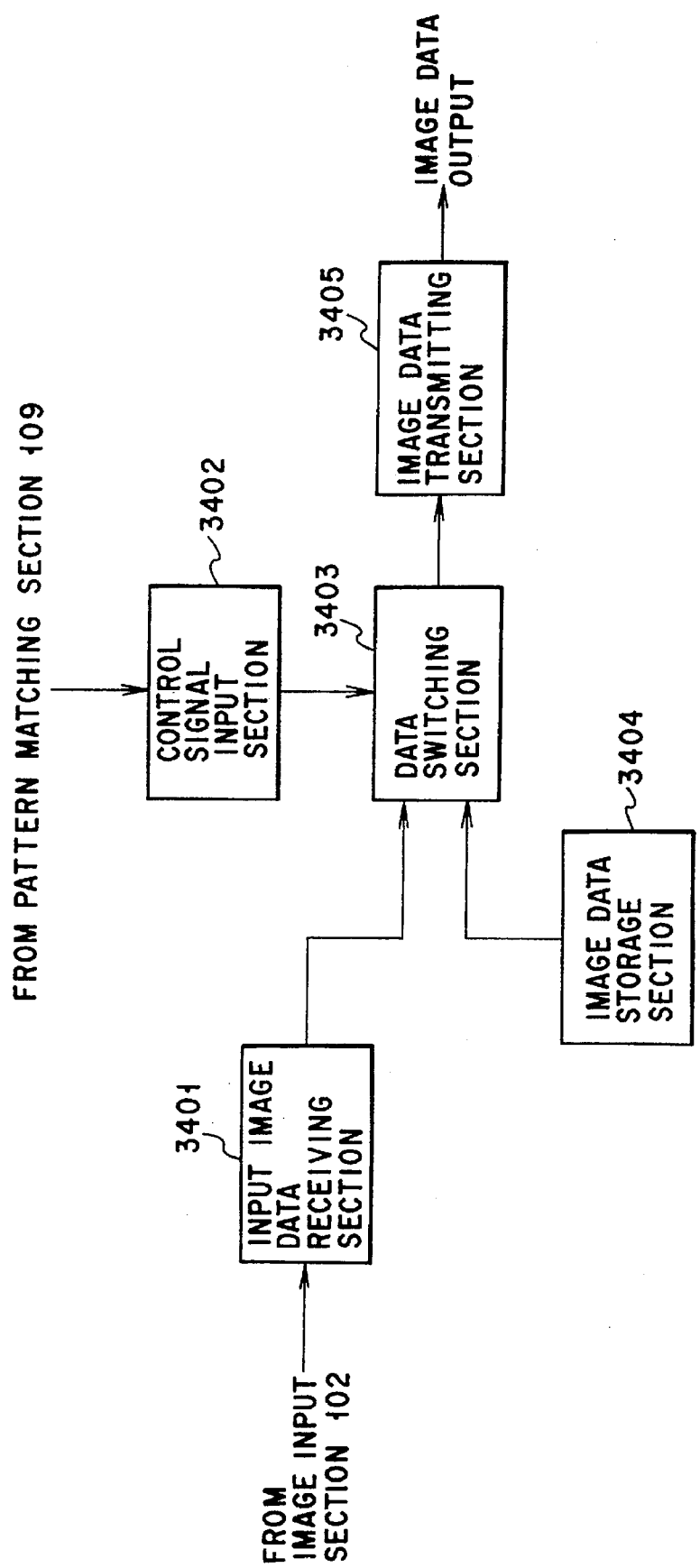
FIG. 33 is a block diagram showing a modification of an image output controlling section.

If the image output controlling section 110 is constructed as shown in FIG. 33, it becomes possible to output image data different from image data output from the color image input section 102 to the exterior and prevent output of the image data which is to be inhibited from being copied.

That is, an input image data receiving section 3401 receives image data output from the color image input section 102, a control signal receiving section 3402 receives the result of determination indicating permission or inhibition of output of the input image data from the pattern matching section 109 and controls a data switching section 3403 based on the received result of determination so as to select one of the output of the input image data receiving section 3401 and image data from an image data storing section 3404 which stores image data different from the input image data.

The data switching section 3403 is controlled to select image data previously stored in the image data storing section 3404 when an image which is inhibited from being copied is contained in the original. Image data selected by the data switching section 3403 is output to the exterior via an image data transmitting section 3405.

With the above construction, input image data can be prevented from being output to the exterior as it is by storing image data 3501 having black level on the entire image area as shown in FIG. 34 in the image data storing section 3404, for example.

This invention is not limited to the above embodiment and can be variously modified without departing from the technical scope thereof.

As described above, according to this invention, an image input apparatus is provided in which a specified original whose image is to be inhibited from being input can always be identified with high precision and the size thereof can be reduced.

What is claimed is:

1. An image input apparatus for inputting a color image, comprising:

storing means for storing a plurality of Vcd reference color data items indicating brightness (V), hue (H) and chroma (C) respectively corresponding to a plurality of color images of a specific original, the Vcd reference color data items corresponding to the brightness (V), hue (H) and chroma (C) of the color image in a correction muncell color system representing color perception amounts of a human being;

reading means for reading a color image on an original containing a plurality of items of target color data;

segmenting means for segmenting a color image read by said reading means into a plurality of areas;

extracting means for extracting the plurality of items of target color data included in each of the plurality of areas segmented by said segmenting means, each of said plurality of items of target color data including red, green and blue components;

transforming means for transforming the plurality of items of target color data included in each of the plurality of areas extracted by said extracting means into a single color data including the red, green and blue components to form transformed target image data;

neural network means for converting the single color data including the red, green and blue components transformed by said transforming means into the Vcd color data items corresponding to the brightness (V), hue (H) and chroma (C) of the color image in the correction muncell color system representing the color perception of a human being;

comparing means for comparing the Vcd color data items of the brightness (V), hue (H) and chroma (C) converted by said neural networks means with the Vcd reference color data items indicating the brightness (V), hue (H) and chroma (C) stored in said storing means;

identifying means for identifying the original read out by said reading means based on a result of the comparison by said comparing means; and inhibiting means for inhibiting the output of an image read by said reading means when it is determined that the original is a specified type of original based on a result of identification by said identifying means.

2. An image input apparatus according to claim 1, wherein said transforming means includes means for normalizing an image of the specified area extracted by said extracting means to an image of preset size to convert the image into area pixels indicating preset color data.

3. An image input apparatus according to claim 1, wherein said transforming means includes means for deriving averaged data of the image of the specified area extracted by said extracting means with neighboring pixels multiplied by preset weight data to create an averaged image and converting the image into pixels indicating preset color data.

4. An image input apparatus according to claim 1, wherein said identifying means includes collating means for deriving an accumulated value of color differences between color data output from said converting means and color data stored in said storing means for all of the pixels and collating them with each other.

5. An image input apparatus for inputting a color image, comprising:

storing means for storing a plurality of Vcd reference color data items indicating brightness (V), hue (H), and chroma (C) respectively corresponding to a plurality of color images of a specific original, the Vcd reference color data items corresponding to the brightness (V), hue (H) and chroma (C) of the color image in a correction muncell color system representing color perception amounts of a human being;

reading means for reading a color image on an original containing a plurality of items of target color data;

segmenting means for segmenting a color image read by said reading means into a plurality of areas;

extracting means for extracting the plurality of items of target color data included in each of the plurality of areas segmented by said segmenting means, each of said plurality of items of target color data including red, green and blue components;

transforming means for transforming the plurality of items of target color data included in each of the plurality of areas extracted by said extracting means into a single color data including the red, green and blue components to form transformed target image data;

neural network means, for converting the single color data including the red, green and value components transformed by said transforming means into the Vcd color data items corresponding to the brightness (V), hue (H) and chroma (C) of the color image in the correction muncell color system representing the color perception of a human being;

comparing means for comparing the Vcd color data items of the brightness (v), hue (H) and chroma (C) converted by said neural networks means with reference color data items indicating the brightness (V), hue (H) and chroma (C) stored in said storing means;

identifying means for identifying the original read out by said reading means based on the result of comparison by said comparing means; and outputting means for outputting a color image different from a color image on the specific original read by said reading means when the original read by said reading means is identified as the specific original in accordance with a result obtained by said identifying means.

6. An image input apparatus according to claim 5, wherein said transforming means includes means for normalizing an image of the specified area extracted by said extracting means to an image of preset size to convert the image into area pixels indicating preset color data.

7. An image input apparatus according to claim 5, wherein said transforming means includes means for deriving averaged data of the image of the specified area extracted by said extracting means with neighboring pixels multiplied by preset weight data to create an averaged image and converting the image into pixels indicating preset color data.

8. An image input apparatus according to claim 5, wherein said identifying means includes collating means for deriving an accumulated value of color differences between color data output from said converting means and color data stored in said storing means for all of the pixels and collating them with each other.

* * * * *